(12) United States Patent
Katayama

(10) Patent No.: US 6,201,780 B1
(45) Date of Patent: Mar. 13, 2001

(54) OPTICAL HEAD WITH A PHASE PLATE FOR DIFFERENT TYPES OF DISKS

(75) Inventor: Ryuichi Katayama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/084,953

(22) Filed: May 28, 1998

(30) Foreign Application Priority Data

May 29, 1997 (JP) .................................................... 9-140129

(51) Int. Cl.⁷ ....................................................... G11B 7/00
(52) U.S. Cl. .................. 369/112; 369/44.23; 369/44.37; 369/94; 369/109; 369/110
(58) Field of Search .................. 369/44.37, 94, 369/112, 44.23, 118, 109, 103, 44.12, 110, 120, 121

(56) References Cited

U.S. PATENT DOCUMENTS

| | | | |
|---|---|---|---|
| 5,408,453 | * 4/1995 | Holtslag et al. | 369/44.23 |
| 5,615,200 | 3/1997 | Hoshino et al. | 369/112 |
| 5,696,750 | 12/1997 | Katayama | 369/112 |
| 5,703,856 | 12/1997 | Hayashi et al. | 369/54 |
| 5,793,734 | * 8/1998 | Tsuchiya et al. | 369/112 |

FOREIGN PATENT DOCUMENTS

| | | |
|---|---|---|
| 0 742 554 | 11/1996 | (EP) . |
| 0 747 893 | 12/1996 | (EP) . |
| 0 831 466 | 3/1998 | (EP) . |
| 8-55363 | 2/1996 | (JP) . |
| 9-44886 | 2/1997 | (JP) . |
| 9-54973 | 2/1997 | (JP) . |
| 9-54977 | 2/1997 | (JP) . |

* cited by examiner

Primary Examiner—John W. Cabeca
Assistant Examiner—Kim-Kwok Chu
(74) Attorney, Agent, or Firm—Foley & Lardner

(57) ABSTRACT

The device has a first optical system 11 and a second optical system 12 which emit and receive laser light of different wavelengths, and is provided with light combining and dividing device (interference filter) 13, which combines lights emitted from the semiconductor lasers 11A of the respective optical systems and divides lights reflected from a recording medium 16 (or 17), guiding then to corresponding photosensors. Between this interference filter 13 and the objective lens 15 is located a phase plate which serves to change the phase distribution of one or the other wavelength from the first or second semiconductor laser 11A. This allows the above-mentioned object to be attained.

38 Claims, 13 Drawing Sheets

Anti-reflection film

FIG. 5
(Location of phase plate pattern 19)
| Numerical aperture | Phase plate pattern |
|---|---|
| 0.00 ~ 0.15 | Yes |
| 0.15 ~ 0.41 | No |
| 0.41 ~ 0.45 | Yes |
FIG. 6(a)
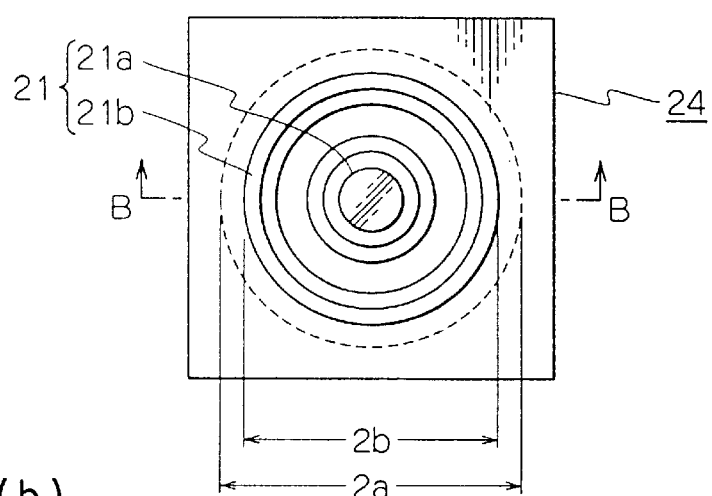
FIG. 6(b)
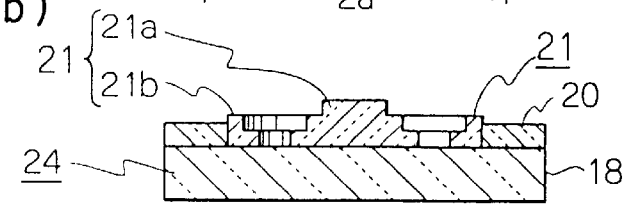

(Location of phase plate pattern 21)

| Numerical aperture | Phase plate pattern |
| --- | --- |
| 0.00 ~ 0.09 | 3 levels |
| 0.09 ~ 0.17 | 2 levels |
| 0.17 ~ 0.25 | 1 levels |
| 0.25 ~ 0.40 | 0 levels |
| 0.40 ~ 0.43 | 1 levels |
| 0.43 ~ 0.45 | 2 levels |

OPTICAL HEAD WITH A PHASE PLATE FOR DIFFERENT TYPES OF DISKS

BACKGROUND OF THE INVENTION

1. Field of the Invention

The present invention relates to an optical head device, and in particular to an optical head device for the purpose of recording and reproducing in relation to two types of optical recording medium having different substrate thickness.

2. Description of the Related Art

Digital video discs (DVD), which are currently in the process of being developed as a product, have a substrate thickness of 0.6 [mm] as compared 1.2 [mm] in the case of the conventional compact disc (CD). In this situation, there is a demand for an optical head device which will be capable of reproducing both DVDs and CDs.

However, conventional optical head devices are designed in such a manner that the objective lens negates spherical aberration in relation to a disc of a certain thickness. Where a disc of a different thickness is reproduced, spherical aberration remains and it is impossible to reproduce it correctly.

[Conventional Example (1)]

The first example of a conventional optical head device which is capable of reproducing two discs of two different thicknesses is illustrated in FIG. 1 on pp. 460–6 of the *Japanese Journal of Applied Physics* Volume 36 Part 1 No. 1B. FIG. 19 illustrates the structure of this optical head device. In FIG. 19, a first optical system 111 and a second optical system 112 each have a semiconductor laser which outputs the prescribed laser light, and a photosensor which receives light reflected from the disc (optical recording medium). Of these, the wavelength of the semiconductor laser of the first optical system 111 is 650 [nm], while that of the second optical system is 780 [nm].

Meanwhile, number 113 indicates an interference filter. This interference filter 113 works in such a manner as to transmit light of wavelength 650 [nm], while reflecting light of wavelength 780 [nm]. In this way, light emitted from the semiconductor laser of the first optical system 111 passes through the interference filter 113 and is incident upon a hologram 161. Light which passes through the hologram 161 is incident upon an objective lens 115 in the form of parallel light and converges on a disc (optical recording medium) 116 with a thickness of 0.6 [mm].

Light reflected from the disc 116 passes through the objective lens 115 in the opposite direction and is incident again upon the hologram 161. Light which passes through the hologram 161 passes through the interference filter 113 and is received by a photosensor within the first optical system 111.

Similarly, light emitted from the semiconductor laser of the second optical system 112 passes through the interference filter 113 and is incident upon a hologram 161. First (+) order diffracted light from the hologram 161 is incident upon an objective lens 115 in the form of divergent light and converges on a disc (optical recording medium) 117 with a thickness of 1.2 [mm].

Light reflected from the disc 117 passes through the objective lens 115 in the opposite direction and is incident again upon the hologram 161. First (+) order diffracted light from the wavelength-selective hologram 161 is reflected by the interference filter 113 and is received by a photosensor within the second optical system 112.

The objective lens 115 has a spherical aberration which negates the spherical aberration generated when light of wavelength 650 [nm] emitted from the objective lens 115 passes through a substrate with a thickness of 0.6 [mm], while the hologram 161 has a spherical aberration which negates the sum of the spherical aberration of the objective lens 115 and that which is generated in relation to +1st order diffracted light from the hologram 161 when light of wavelength 780 [nm] emitted from the objective lens 115 passes through a substrate with a thickness of 1.2 [mm].

Consequently, light of wavelength 650 [nm] which passes through the hologram 161 converges as a result of the objective lens 115 without aberration on the disc 116, while +1st order diffracted light of wavelength 780 [nm] converges as a result of the objective lens 115 without aberration on the disc 117.

FIG. 20 presents a top view and a cross-sectional view of the hologram 161.

The hologram 161 is structured in such a manner that a concentric hologram pattern is formed on a glass substrate 118.

Where the cross-section of the hologram pattern 162 is in the form of steps on four levels as in the drawing, and the height of each step is h/2, the refractive index n, and the wavelength of the incident light λ, the transmission efficiency $\eta_0$ and +1st order diffraction efficiency $\eta_{+1}$ are given by the following formulae.

$$\eta_0 = \cos^2(\phi/2)\cos^2(\phi/4) \tag{1}$$

$$\eta_{+1} = (8/\pi^2)\sin^2(\phi/2)\cos^2[(\phi+\pi)/4] \tag{2}$$

$$\text{where, } \phi = 2\pi(n-1)h/\lambda \tag{3}$$

For instance, when h=2.83 [μm] and n=1.46, since φ=4π for λ=650 [nm], $\eta_0=1$, $\eta_{+1}=0$.

Similarly, since φ=3.33 π for λ=780 [nm], $\eta_0=0.188$, $\eta_{+1}=0.567$.

In other words, light of wavelength 650 [nm] emitted from a semiconductor laser all passes through the hologram 161 and heads towards the disc 116, while 56.7% of light of wavelength 780 [nm] emitted from a semiconductor laser is diffracted by the wavelength-selective hologram 161 as +1st order diffracted light and heads towards the disc 117.

Moreover, as FIG. 20 shows, if the effective diameter of the objective lens 115 is 2a, the hologram pattern 162 is formed only within an area 2b of a diameter smaller than this. Outside the area of diameter 2b, light of wavelengths 650 [nm] and 780 [nm] all passes through the hologram 161.

In other words, with the hologram 116, light of wavelength 650 [nm] all passes through, while 56.7% of light of wavelength 780 [nm] is diffracted within the area of diameter 2b as +1st order diffracted light, and none is diffracted outside the area of diameter 2b, where 2a and 2b are the diameters shown in FIG. 20(a).

Consequently, if the focal length of the objective lens 115 is f, the effective numerical aperture in relation to light of wavelengths 650 [nm] and 780 [nm] is given by a/f and b/f respectively. For example, if f=3 [mm], a=1.8 [mm] and b=1.35 [mm], a/f=0.6 while b/f=0.45.

[Conventional Example (2)]

The second example of a conventional optical head device which is capable of reproducing two discs of two different thicknesses is illustrated in FIG. 7 on pp. 460–6 of the *Japanese Journal of Applied Physics* Volume 36 Part 1 No. 1B. FIG. 21 illustrates the structure of this optical head device (conventional example 2).

In FIG. 21 also, a first optical system 111 and a second optical system 112 each have a semiconductor laser, and a photosensor which receives light reflected from the disc. The wavelength of the semiconductor laser of the first optical system 111 is 650 [nm], while that of the second optical system is 780 [nm]. The interference filter 113 works in such a manner as to transmit light of wavelength 650 [nm], while reflecting light of wavelength 780 [nm].

Light emitted from the semiconductor laser of the first optical system 111 passes through the interference filter 113 and an aperture 163 to be incident upon the objective lens 115 in the form of parallel light and converge on the disc 116, which has a thickness of 0.6 [mm]. Light reflected from the disc 116 passes in the opposite direction through the objective lens 115, aperture 163 and interference filter 113, and is received by the photosensor within the first optical system 111. Meanwhile, light emitted from the semiconductor laser of the second optical system 112 is reflected by the interference filter 113, and passes through the aperture 163 to be incident upon a objective lens 115 in the form of divergent light and converge on the disc 117, which has a thickness of 1.2 [mm].

Light reflected from the disc 117 passes in the opposite direction through the objective lens 115 and aperture 163, is reflected by the interference filter 113, and received by the photosensor within the first optical system 111.

The objective lens 115 has a spherical aberration which negates the spherical aberration generated when light of wavelength 650 [nm] emitted from the objective lens 115 passes through a substrate with a thickness of 0.6 [mm].

When light of wavelength 780 [nm] which is incident upon the objective lens 115 in the form of parallel light passes through a substrate with a thickness of 1.2 [mm], the spherical aberration remains.

However, when light of wavelength 780 [nm] is incident upon the objective lens 115 in the form of divergent light, new spherical aberration is generated accompanying object point movement of the objective lens 115, and this works in the direction of negating the spherical aberration which remains when it passes through a substrate with a thickness of 1.2 [mm].

Consequently, if the object point position of light of wavelength 780 [nm] is set at its optimum, light of wavelength 650 [nm] converges without aberration on the disc 116, while light of wavelength 780 [nm] converges without aberration on the disc 117.

FIG. 22 (a), (b) present a top view and a cross-sectional view of the aperture member 163. This aperture member 163 is structured in such a manner that an interference filter pattern 120 is formed on a glass substrate 118.

If the effective diameter of the objective lens 115 is $2a$, the interference filter pattern 120 is formed only outside an area of a diameter $2b$ smaller than this.

The interference filter pattern 120 not only serves to allow all the light of wavelength 650 [nm] to pass through and all the light of wavelength 780 [nm] to be reflected, but also serves to adjust to an integral multiple of $2\pi$ the phase difference between the light which passes through within the area of diameter $2b$ and that which passes through outside it. In other words, with the aperture member 163, light of wavelength 650 [nm] all passes through within the area of diameter $2a$, while all the light of wavelength 780 [nm] passes through within the area of diameter $2b$, and is all reflected outside that area.

Consequently, if the focal length of the objective lens 115 is f, the effective numerical aperture in relation to light of wavelengths 650 [nm] and 780 [nm] is given by $a/f$ and $b/f$ respectively.

For example, if f=3 [mm], a=1.8 [mm] and b=1.35 [mm], $a/f=0.6$ while $b/f=0.45$.

[Conventional Example (3)]

The third example of a conventional optical head device which is capable of reproducing two discs of two different thicknesses is disclosed in Japanese Patent H6[1994]-295467. This optical head device has a variable phase plate 164 between the semiconductor laser and the objective lens. The variable phase plate 164 is structured in such a manner that a ring-shaped substrate 165, sandwiched between electrodes 166, is formed on a glass substrate 118.

The ring-shaped substrate 165 has the property that its refractive index changes according to the electric field, so that by altering the voltage impressed on the electrodes 166 it is possible to change the phase difference of the light passing through the interior and exterior of the ring-shaped substrate 165.

FIG. 24 is a diagram which illustrates the properties of wave front aberration in this optical head device.

The horizontal axis represents the wave front aberration normalized by the wavelength of the light, while the vertical axis represents the distance from the optical axis normalized by the focal length of the objective lens, i.e. the numerical aperture.

Taking the wavelength of the light as 670 [nm], the numerical aperture of the objective lens as 0.6, and the difference in substrate thickness in relation to the design value as +0.1 [mm]. The focus is controlled in such a manner that wave front aberration of a beam of numerical aperture 0.6 is 0.

FIG. 24 (a) illustrates an example where no phase difference is given by the ring-shaped substrate 165, and the standard deviation of the wave front aberration is 0.095 λ. Meanwhile, FIG. 24 (b) illustrates an example where a ring-shaped substrate 165 with an internal numerical aperture of 0.244 and an external numerical aperture of 0.560 has given a phase difference of 0.316 π, and the standard deviation of the wave front aberration is reduced to 0.048 λ.

In the first example of a conventional optical head device, light of wavelength 650 [nm] all passes through the hologram 161, while 56.7% of light of wavelength 780 [nm] is diffracted by the hologram 161 as +1st order diffracted light.

This results in the disadvantage that it is impossible to obtain a good S/N when reproducing the disc 117, or to obtain satisfactory optical output when recording.

In the second example of a conventional optical head device, light of wavelength 650 [nm] is incident upon the objective lens 115 in the form of parallel light, while light of wavelength 780 [nm] is incident in the form of divergent light. As a result, the light of wavelength 650 [nm] does not generate any aberration when the objective lens 115 is driven by means of the actuator in the focusing or tracking direction, but the light of wavelength 780 [nm] does.

This results in the disadvantage that it is impossible to obtain a good S/N and jitter N when reproducing the disc 117, or to obtain satisfactory peak intensify when recording.

The light in the third example of a conventional optical head device is of a single wavelength. It is possible to reproduce a digital video disc at wavelength 650 [nm], but not at 780 [nm] because it is impossible to obtain a sufficiently small light spot diameter.

Conversely, it is possible to reproduce a recordable compact disc at wavelength 780 [nm], but not at 650 [nm] because it is impossible to obtain a sufficiently reflecticity. This results in the disadvantage that recordable compact discs cannot be reproduced if the wavelength of the light is 650 [nm].

SUMMARY OF THE INVENTION

It is an object of the present invention to solve the conventional problems described above in relation to an optical head device capable of reproducing two types of disc of different thickness, and to provide an optical head device which not only allows good S/N and jitter to be obtained during reproduction along with satisfactory optical output and peak intensity during recording, but also makes it possible to reproduce recordable compact discs.

With a view to solving the abovementioned problem, the present invention is provided with a first optical system having a first semiconductor laser which oscillates at a prescribed wavelength and a first photosensor which receives laser light of said wavelength, and a second optical system having a second semiconductor laser which oscillates at a different prescribed wavelength from the semiconductor laser of the first optical system and a second photosensor which receives laser light of said wavelength.

Moreover, it is fitted with a light combining and dividing device whereby light emitted from the aforesaid first and second semiconductor lasers is combined and guided to a prescribed optical recording medium having a prescribed thickness, while light reflected from said optical recording medium is divided and guided respectively to said first or second photosensor. An objective lens is located between this light combining and dividing device and the aforesaid prescribed optical recording medium.

Furthermore, it is fitted between the aforesaid light combining and dividing device and the aforesaid objective lens with a phase plate of a nature such that it barely changes the phase distribution in relation to one wavelength of light from the aforesaid first or second semiconductor lasers, while changing the phase distribution in relation to the other wavelength.

In addition, the light emitted from the aforesaid first semiconductor laser is used for the purpose of recording or reproducing in relation to a prescribed optical recording medium, while the light emitted from the aforesaid second semiconductor laser is used for the purpose of recording or reproducing in relation to another prescribed optical recording medium.

That is to say, the present invention has two semiconductor lasers of different wavelengths, light of the wavelength from the first semiconductor laser being used for the purpose of recording and reproducing in relation to another disc of the corresponding prescribed thickness, and light of the wavelength from the second semiconductor laser is used for the purpose of recording and reproducing in relation to a disc of the corresponding prescribed thickness.

The phase plate corrects the spherical aberration which results from the difference in substrate thickness by virtue of the fact that it does not change the phase distribution in relation to light of the wavelength from the first semiconductor laser, while changing the phase distribution in relation to light of the wavelength from the second semiconductor laser.

Because light of the above-mentioned first and second wavelengths all passes through the phase plate, a good S/N is obtained during reproduction along with satisfactory optical output during recording.

In this case, the prescribed wavelength output from the first optical system may be set in the vicinity of 650 [nm], while the prescribed wavelength output from the second optical system may be set in the vicinity of 780 [nm].

Moreover, the laser light output from the first optical system may be targeted at an optical recording medium with a thickness of around 0.6 [mm], while the laser light output from the second optical system may be targeted at an optical recording medium with a thickness of around 1.2 [mm].

Furthermore, the light emitted from the first and second semiconductor lasers may be incident upon the aforesaid objective lens in the form of parallel light. This not only allows good jitter to be obtained during reproduction because no aberration occurs even when the objective lens moves, but also makes it possible to achieve satisfactory peak intensity during recording.

Moreover, setting the aforesaid other wavelength at 780 [nm] means that it is also possible to reproduce recordable compact discs.

The aforesaid phase plate may be of a structure such that a concentric phase plate pattern and interference pattern are formed on a substrate.

If so, the phase plate pattern may be formed only within a circular area with a diameter less than the effective diameter of the objective lens. In this case, the cross-section of the phase plate pattern may be in the shape of a rectangle with two levels, or in the shape of a staircase with three or more levels.

The phase difference of the light which passes through the higher and lower of two adjacent stages in the phase plate pattern may be an integral multiple of $2\pi$ in relation to the wavelength of the light emitted from the first or second semiconductor lasers.

The aforesaid interference filter pattern may be formed only outside the aforesaid circular area. This interference filter pattern has the property of allowing all the light of the wavelength output from the first optical system to pass through, while reflecting all the light of the wavelength output from the second optical system, and adjusts the phase difference of the light which passes within the circular area and that which passes outside it to an integral multiple of $2\pi$ in relation to the wavelength which is output from the first optical system.

Moreover, the aforesaid phase plate may be structured in such a manner as to be driven together with the objective lens by means of an actuator in the focusing direction and in the tracking direction. In this case, the normal of the phase plate may be inclined slightly in relation to the optical axis of the objective lens.

The aforesaid light combining and dividing device may be formed by an interference filter with the property of allowing light of the wavelength output from the first optical system to pass through, while reflecting light of the wavelength output from the second optical system.

Furthermore, the aforesaid phase plate pattern may be formed by depositing a dielectric film onto a glass substrate.

The aforesaid interference filter pattern may be formed by depositing a multilayered dielectric film onto a glass substrate. In this case, the multilayered dielectric film may be structured in such a manner that it comprises an odd number of layers whereof the first layer has a low refractive index, while these layers onward have alternate high and low refractive indices.

Moreover, the phase plate pattern and the interference filter pattern may be formed on the same surface of the same glass substrate.

The phase plate pattern and the interference filter pattern may also be formed on different surfaces of the same glass substrate.

Furthermore, this phase plate pattern and the interference filter pattern may be formed on different glass substrates. In this case, the twin surfaces of the different glass substrates on which the phase plate pattern and interference filter pattern are formed may be attached to each other by means of an adhesive agent.

An anti-reflection film may be formed on one or both of the surfaces of the glass substrate.

Moreover, the aforesaid phase plate pattern may be formed by molding glass or plastic.

Furthermore, the phase plate pattern or the interference filter pattern may be formed on the surface of the objective lens.

Moreover, the first optical system or the second optical system may be provided with a collimator lens which ensures that light emitted respectively from the aforesaid first or second semiconductor laser is parallel. Its efficacy is as has been described above.

Furthermore, the first optical system or the second optical system may be provided with means of separating light whereby light emitted from the first or second semiconductor laser housed within it and heading for the corresponding recording medium is separated from light reflected by the first or second recording medium and heading for the first or second photosensor.

In this case, the means of separating light may be a beam splitter. Moreover, the means of separating light may be a polarizing beam splitter, and a quarter-wave plate may be located between this polarizing beam splitter and the objective lens.

Furthermore, the first semiconductor laser and the first photosensor, or the second semiconductor laser and the second photosensor may be contained in the same package.

In this case, the means of separating light may be a holographic optical element. Moreover, the means of separating light may be a polarizing holographic optical element, and quarter-wave plate may be located between this polarizing holographic optical element and the aforesaid objective lens.

BRIEF DESCRIPTION OF THE DRAWINGS

FIG. 5 This is a table showing the design of the phase plate pattern of FIG. 3 which was used to obtain the graph shown in FIG. 4.

FIG. 6 These are diagrams illustrating another example of the wavelength-selective phase plate used in the first embodiment as illustrated in FIG. 1, FIG. 6 (a) being a top view, while FIG. 6 (b) is a cross-sectional diagram along the line B—B in FIG. 6 (a).

DESCRIPTION OF THE PREFERRED EMBODIMENTS

There follows a description of embodiments of the optical head device to which the present invention pertains.

[First Embodiment]

Figure 1:
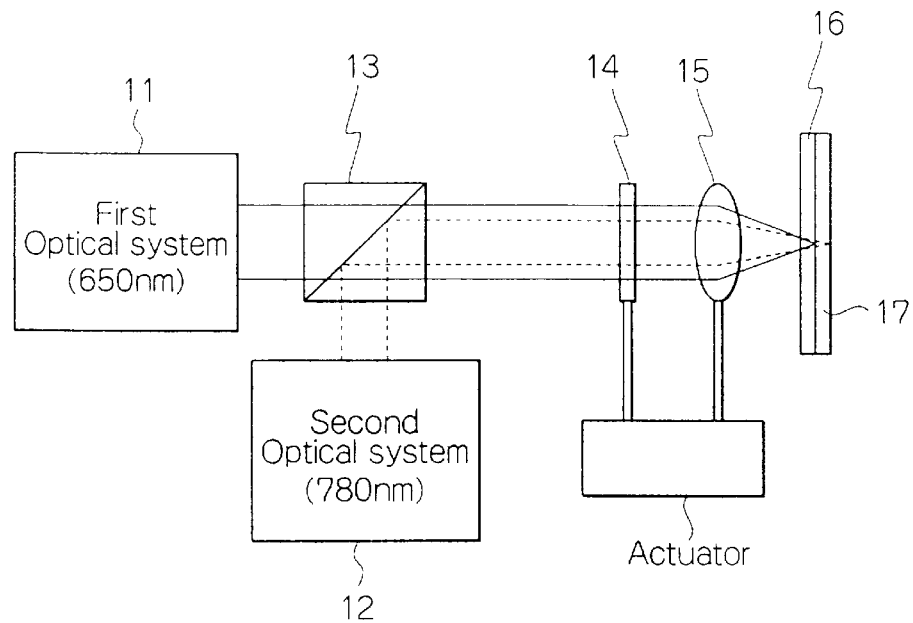
FIG. 1 This is a block diagram illustrating the first embodiment of the present invention.

FIG. 1 is a block diagram illustrating the first embodiment of the present invention.

In FIG. 1, an optical system 11 and an optical system 12 are fitted opposite to a light combining and dividing device 13 and separated bidirectionally in the same plane. Each of these optical systems 11 and 12 is provided with a semiconductor laser, and a photosensor which receives light reflected from a disc (recording medium). In FIG. 1, the number 14 represents a phase plate.

The interference filter 13 serves to allow light of wavelength 650 [nm] to pass through, while reflecting light of wavelength 780 [nm].

Accordingly, in the embodiment illustrated in FIG. 1, the wavelength of the semiconductor laser within the first optical system 11 is 650 [nm], and that of the semiconductor laser within the second optical system 12 is 780 [nm].

Light emitted from the semiconductor laser within the first optical system 11 passes through the interference filter 13 and phase plate 14 to be incident upon the objective lens 15 in the form of parallel light, and to converge on the disc 16 having a substrate thickness of 0.6 [mm], which is the optical recording medium.

Light reflected from this disc 16 passes in the opposite direction through the objective lens 15, phase plate 14 and interference filter 13, and is received by the photosensor within the aforesaid first optical system 11. Meanwhile, light emitted from the semiconductor laser within the second optical system 12 is reflected by the interference filter 13 and passes through the phase plate 14 to be incident upon the objective lens 15 in the form of parallel light, and to converge on the disc 17 having a substrate thickness of 1.2 [mm], which is the optical recording medium.

Light reflected from this disc 17 passes in the opposite direction through the objective lens 15 and phase plate 14, is reflected by the interference filter 13, and after that is received by the photosensor within the aforesaid second optical system 12.

Here, the objective lens 15 has a spherical aberration which negates the spherical aberration generated when light of wavelength 650 [nm] emitted from the objective lens passes through a substrate having a thickness of 0.6 [mm].

Consequently, if the phase plate 14 is not used, the spherical aberration generated when light of wavelength 780 [nm] emitted from the objective lens passes through a substrate having a thickness of 1.2 [mm] remains.

Figure 2:
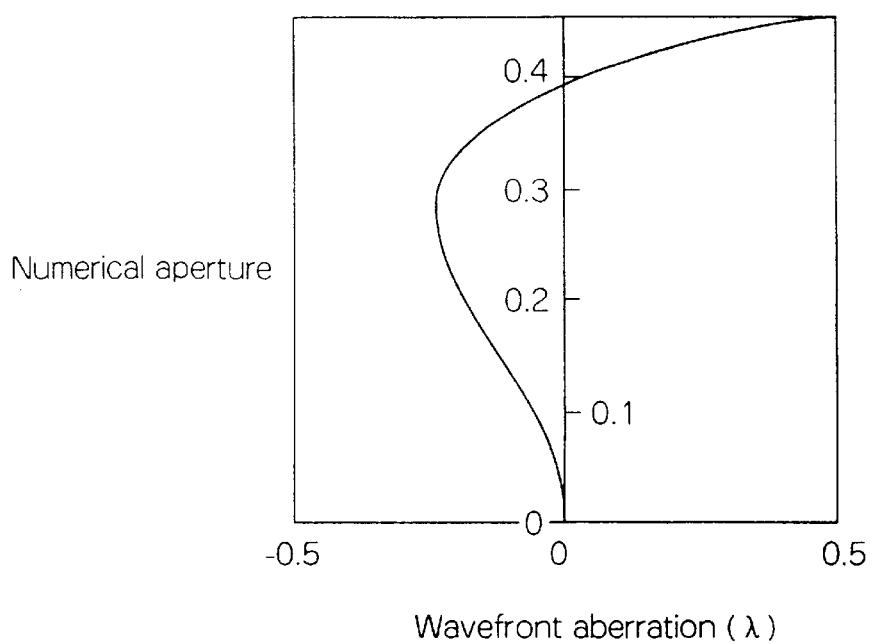
FIG. 2 This is a line diagram illustrating changes in wavefront aberration according to the first embodiment as illustrated in FIG. 1, where no wavelength-selective phase plate is used.

FIG. 2 is a diagram which illustrates the properties of wavefront aberration where no wavelength-selective phase plate 14 is used. As in the case of FIG. 24, which illustrates a conventional example, the horizontal axis represents wavefront aberration, while the vertical axis represents the numerical aperture. Focus control is implemented in order to ensure minimum standard deviation of the wavefront aberration, and the effective numerical aperture of the objective lens 15 in relation to light of wavelength 780 [nm] is 0.45.

The optimum image surface at this time is 9.4 [μm] farther away from the objective lens 15 in relation to the position of the image surface when there is no aberration, and the standard deviation of wavefront aberration in that position is 0.188 λ.

Figure 3A:
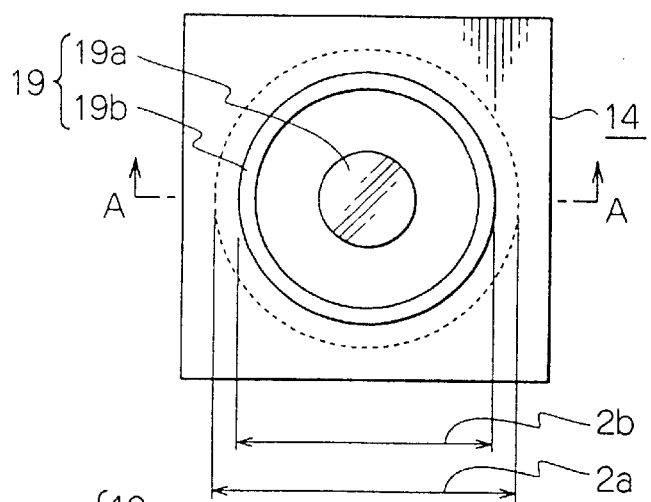
FIG. 3 These are diagrams illustrating the wavelength-selective phase plate used in the first embodiment as illustrated in FIG. 1, FIG. 3 (a) being a top view, while FIG. 3 (b) is a cross-sectional diagram along the line A—A in FIG. 3 (a).
Figure 3B:
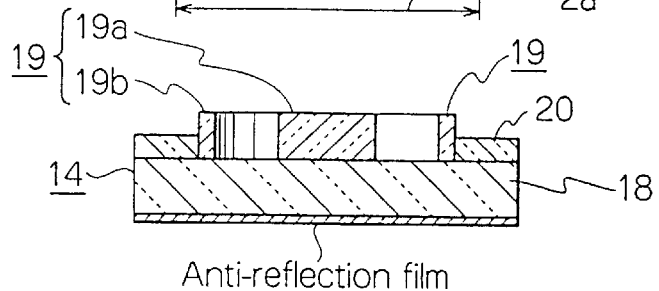

FIGS. 3 (*a*) and (*b*) are respectively a top view and a cross-sectional drawing which illustrate the phase plate 14 which is used in the first embodiment as shown in FIG. 1. This phase plate 14 consists of a concentric phase plate pattern 19 and interference filter pattern 20 formed on a glass substrate 18. Here, the phase plate pattern 19 is of a structure such that it has a cylindrical phase plate pattern 19*a* in the center, and an annular phase plate pattern 19*b* of the same height at a prescribed distance around it. An interference filter pattern 20 is formed in such a manner that it is overall lower than the phase plate pattern 19.

If the effective diameter of the objective lens 15 is 2*a*, the phase plate pattern 19 is formed only within an area of which the diameter 2*b* is smaller than this. The cross-section of the phase plate pattern 19 is rectangular and of two levels (including substrate) as in FIG. 3 (*b*).

If the height of the phase plate pattern 19 is h, its reflective index of refraction n, and the wavelength of the incident light λ, the phase difference of light passing through the sections with and without the phase plate pattern 19 is given by the aforesaid formula (3).

For instance, where h=2.83 [μm] and n=1.46, φ=4 π (=0) in relation to λ=650 [nm], and φ=3.33 π (=−0.67 π) in relation to λ=780 [nm].

The interference filter pattern 20 is formed only outside the area of diameter 2*b*, as FIG. 3 (*b*) shows.

In this case, the interference filter pattern 20 serves not only to transmit all light of wavelength 650 [nm] and reflect all light of wavelength 780 [nm], but to adjust to an integral multiple of 2π the phase difference of light passing through within and outside the area of diameter 2*b*.

In other words, with the phase plate 14, light of wavelength 650 [nm] all passes through without undergoing any change of phase distribution in the area of diameter 2*a*. Meanwhile, light of wavelength 780 [nm] undergoes change of phase distribution in the area of diameter 2*b* and all passes through, but outside the area of diameter 2*b* is all reflected.

Consequently, if the focal length of the objective lens 15 is f, the effective numerical aperture in relation to light of wavelengths 650 [nm] and 780 [nm] is given by a/f and b/f respectively. For instance, if f=3 [mm], a=1.8 [mm] and b=1.35 [mm], a/f=0.6 and b/f=0.45.

Figure 4:
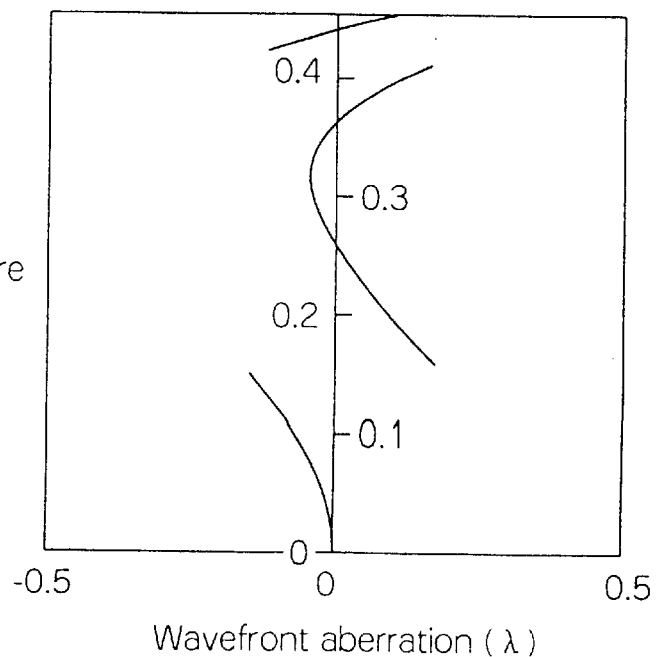
FIG. 4 This is a line diagram illustrating changes in wavefront aberration according to the first embodiment as illustrated in FIG. 1, where the wavelength-selective phase plate illustrated in FIG. 3 is used.

FIG. 4 is a diagram which illustrates the properties of wavefront aberration where the phase plate 14 illustrated in FIG. 3 is used. As in the case of the aforesaid FIG. 24 (conventional example), the horizontal axis represents wavefront aberration, while the vertical axis represents the numerical aperture.

Here, the effective numerical aperture of the objective lens 15 in relation to light of wavelength 780 [nm] is set at 0.45, and the position of the phase plate pattern 19 is set as in the table shown in FIG. 5. Focus control is implemented to ensure minimum standard deviation of wavefront aberration. The optimum image surface at this time is 12.0 [μm] farther away from the objective lens 15 in relation to the position of the image surface when there is no aberration, and the standard deviation of wavefront aberration in that position is 0.076 λ.

Consequently, light of wavelength 650 [nm] converges thanks to the objective lens 15 on the disc 16 without any aberration. Meanwhile, light of wavelength 780 [nm] converges thanks to the objective lens 15 on the disc 17, the spherical aberration accompanying the difference in substrate thickness being reduced from the aforesaid 0.188 λ to 0.076 λ.

Figure 24A:
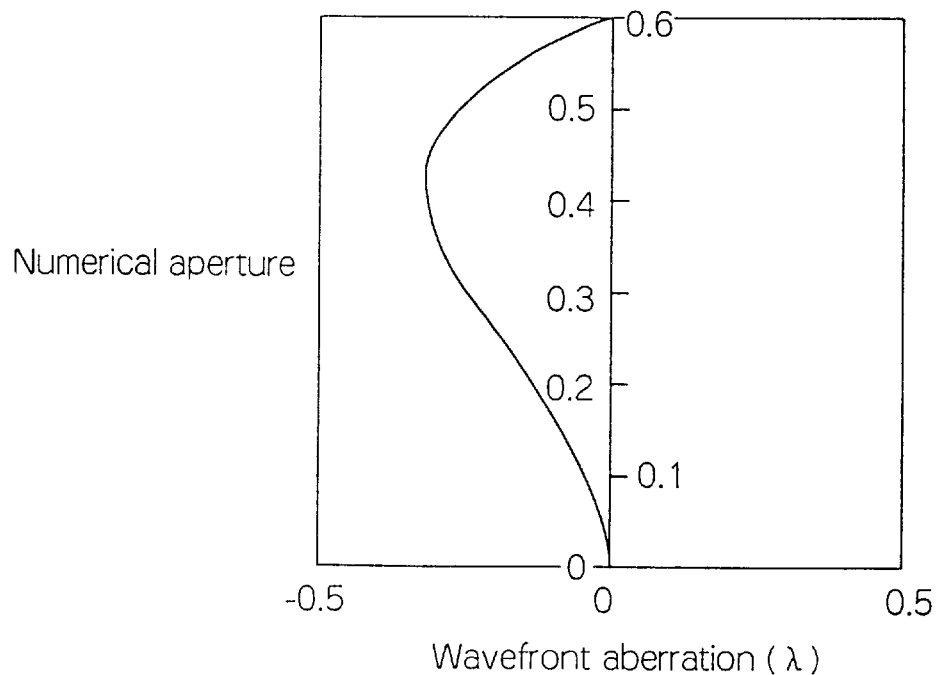
FIG. 24 This is an explanatory diagram illustrating the property of wavefront aberration in the third example of a conventional optical head device, FIG. 24 (*a*) being a diagram showing the property in a case where no phase difference is given, while FIG. 24 (*b*) is a line diagram showing the property in a case where the prescribed phase difference has been given.
Figure 24B:
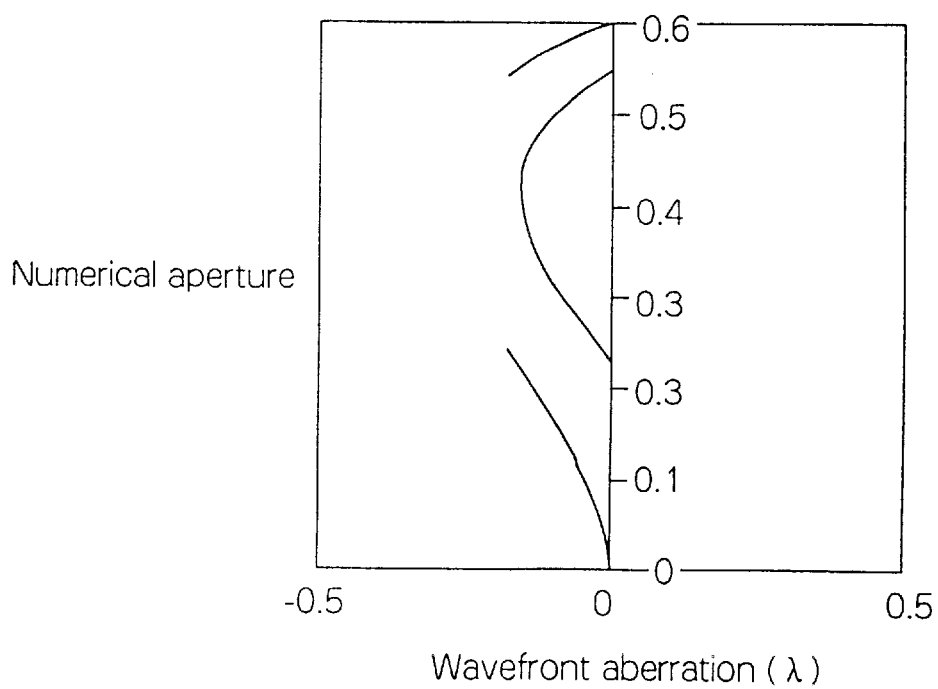

It should be pointed out with respect to FIG. 24, which illustrates a conventional example, that a comparison of FIG. 24 (b) with FIG. 24 (a) shows a shift in wave front aberration in the positive direction in the part where the ring-shaped substrate 165 is. Conversely, a comparison of FIG. 4, which illustrates the present embodiment, with FIG. 2 shows a shift in wavefront aberration in the positive direction in the part where there is no phase plate pattern 19.

This is because the phase difference φ given by formula (3) is positive in the ring-shaped substrate 165 of the conventional example, but effectively negative in the phase plate pattern 19 in the present embodiment.

In the phase plate 14 illustrated in FIG. 3, the phase difference of light which passes through the parts where the phase plate pattern 19 is present or is not present is 4 π in relation to λ=650 [nm], but it need not be 4 π, and may be an integral multiple of 2π.

FIG. 6 consists of diagrams illustrating another example of the phase plate 14 (wavelength-selective phase plate 24) used in the first embodiment as illustrated in FIG. 1, FIG. 6 (a) being a top view, while FIG. 6 (b) is a cross-sectional diagram along the line B—B in FIG. 6 (a). This phase plate 24 is structured in such a manner that a concentric phase plate pattern 21 and interference filter pattern 20 are formed on a glass substrate 18.

Here, if the effective diameter of the objective lens 15 is 2a, the phase plate pattern 21 is formed only within an area of which the diameter 2b is smaller than this. In this case, the phase plate pattern 21 has a phase plate pattern 21a in the center which is formed so as to present a cross-section in the shape of a pyramid (staircase of four levels including substrate) with a flat portion at the top, and an annular phase plate pattern 21b at a prescribed distance around it. In this case, the annular phase plate pattern 2b is formed in such a manner that the cross-section is in the shape of three levels (including substrate). The height of the aforesaid phase plate pattern 21a is set in the present embodiment at approximately 1.5 times larger than that of the annular phase plate pattern 21b.

Moreover, the interference filter pattern 20 is formed in such a manner as to be lower overall than the phase plate pattern 21.

To explain this in relation to phase difference, if in a four-level staircase shape like the one shown in FIG. 6 (b) the difference in height of two adjacent steps is h, the refractive index n, and the wavelength of the incident light λ, the phase difference of light passing through the higher and lower of the two adjacent steps in the phase plate pattern 21 is given by the aforesaid formula (3).

For instance, where h=1.41 [μm] and n=1.46, φ=2π (=0) in relation to λ=650 [nm], and φ=1.67 π (=−0.33 π) in relation to λ=780 [nm].

Here, the interference filter pattern 20 is formed only outside the area of diameter 2b, as FIG. 6 (b) shows. This interference filter pattern 20 serves not only to transmit all light of wavelength 650 [nm] and reflect all light of wavelength 780 [nm], but to adjust to an integral multiple of 2π the phase difference of light passing through within and outside the area of diameter 2b.

In other words, with the wavelength-selective phase plate 24, light of wavelength 650 [nm] all passes through without undergoing any change of phase distribution in the area of diameter 2a. Meanwhile, light of wavelength 780 [nm] undergoes change of phase distribution in the area of diameter 2b and all passes through, but outside the area of diameter 2b is all reflected.

Consequently, if the focal length of the objective lens 15 is f, the effective numerical aperture in relation to light of wavelengths 650 [nm] and 780 [nm] is given by a/f and b/f respectively. For instance, if f=3 [mm], a=1.8 [mm] and b=1.35 [mm], a/f=0.6 and b/f=0.45.

Figures 7, 8:
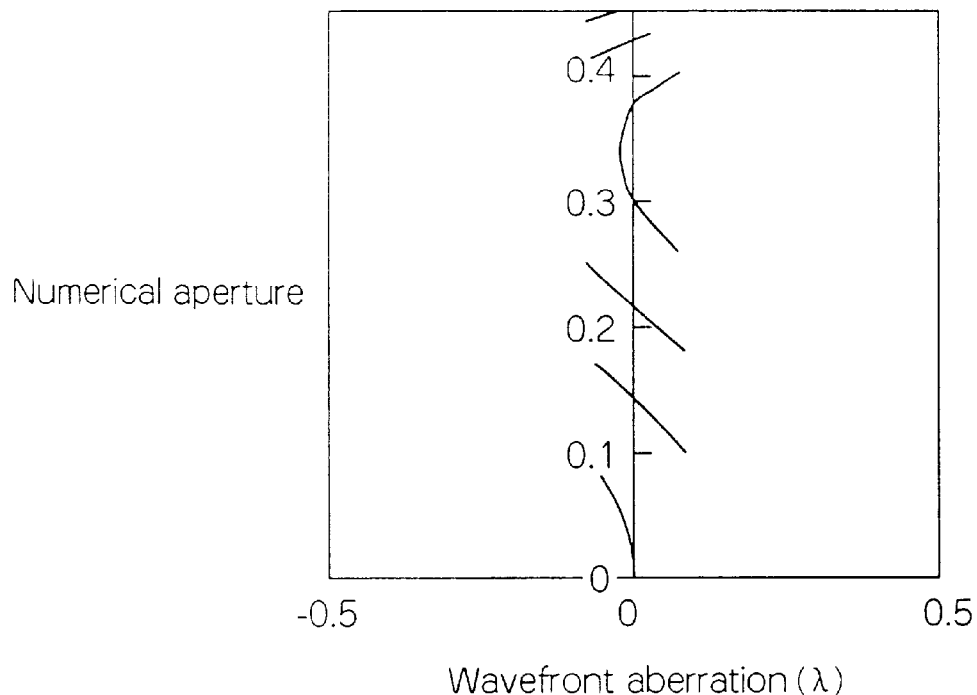
FIG. 7 This is a line diagram illustrating changes in wavefront aberration according to the first embodiment as illustrated in FIG. 1, where the wavelength-selective phase plate illustrated in FIG. 6 is used.
FIG. 8 This is a table showing the design of the phase plate pattern of FIG. 6 which was used to obtain the graph shown in FIG. 7.

FIG. 7 is a diagram illustrating the properties of wavefront aberration where the phase plate 24 shown in FIG. 6 is used. As in the case of the aforesaid conventional example of FIG. 24, the horizontal axis represents wavefront aberration, while the vertical axis represents the numerical aperture.

Here, the effective numerical aperture of the objective lens 15 in relation to light of wavelength 780 [nm] is set at 0.45, and the position of the phase plate pattern 21 is set as in FIG. 8. Again, focus control is implemented to ensure minimum standard deviation of wavefront aberration.

The optimum image surface at this time is 14.1 [μm] farther away from the objective lens 15 in relation to the position of the image surface when there is no aberration, and the standard deviation of wavefront aberration in that position is 0.042 λ.

Consequently, light of wavelength 650 [nm] converges thanks to the objective lens 15 on the disc 16 without any aberration. Meanwhile, light of wavelength 780 [nm] converges thanks to the objective lens 15 on the disc 17, the spherical aberration accompanying the difference in substrate thickness being reduced from the aforesaid 0.188 λ to 0.042 λ.

It should be pointed out with respect to the conventional example, that a comparison of FIG. 24 (b) with FIG. 24 (a) shows a shift in wavefront aberration in the positive direction in the part where the ring-shaped substrate 165 is. Conversely, a comparison of FIG. 7, which illustrates the present embodiment, with FIG. 2 shows a considerable shift in wavefront aberration in the positive direction towards the lowest of the four levels of the phase plate pattern 21.

This is because the phase difference φ given by formula (3) is positive in the ring-shaped substrate 165, but effectively negative in the phase plate pattern 21.

In the phase plate 24 illustrated in FIG. 6, the phase difference of light which passes through the higher and lower of two adjacent steps of the phase plate pattern 21 is 2 π in relation to λ=650 [nm], but it need not be 2 π, and may be an integral multiple of 2π.

Moreover, the cross-section of the phase plate pattern 21 in the phase plate 24 illustrated in the above-mentioned FIG. 6 has four levels, but this may be any number of levels from three upwards.

Furthermore, in the above embodiment the discs 16 and 17 have been drawn in one place on top of each other. This is for the sake of convenience of description. It means that, for instance, it can be used for both DVD and CD, but it should be borne in mind that the two are originally fitted and used separately. The same applies below.

[Second Embodiment]

Figure 9:
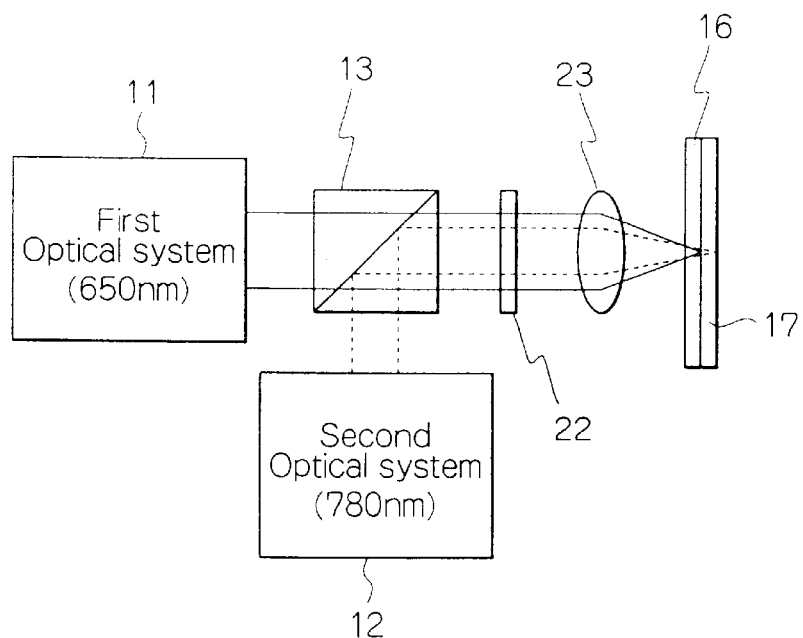
FIG. 9 This is a block diagram illustrating the second embodiment of the present invention.

FIG. 9 is a block diagram illustrating the second embodiment of the present invention.

In FIG. 9, an optical system 11 and an optical system 12 are provided with semiconductor lasers and photosensors which receive light reflected from a disc (recording medium) as in the case of the first embodiment. Also as in the first embodiment, the wavelength of the semiconductor laser within the first optical system 11 is set at 650 [nm], while that of the semiconductor laser within the second optical system 12 is set at 780 [nm].

The interference filter 13 serves to allow light of wavelength 650 [nm] to pass through, while reflecting light of wavelength 780 [nm].

Light emitted from the semiconductor laser within the first optical system 11 passes through the interference filter 13 and phase plate 22 to be incident upon the objective lens 23 in the form of parallel light, and to converge on the disc 16 having a substrate thickness of 0.6 [mm].

Meanwhile, light reflected from this disc 16 passes in the opposite direction through the objective lens 23, phase plate 22 and interference filter 13, and is received by the photosensor within the aforesaid first optical system 11.

On the other hand, light emitted from the semiconductor laser within the second optical system 12 is reflected by the interference filter 13 and passes through the wavelength-selective phase plate 22 to be incident upon the objective lens 23 in the form of parallel light, and to converge on the disc 17 having a substrate thickness of 1.2 [mm]. Light reflected from this disc 17 passes in the opposite direction through the objective lens 23 and phase plate 22, is reflected by the interference filter 13, and after that is received by the photosensor within the aforesaid second optical system 12.

The objective lens 23 has on its inner periphery a spherical aberration which negates the spherical aberration generated when light of wavelength 780 [nm] emitted from the objective lens passes through a substrate having a thickness of 1.2 [mm], while having on its outer periphery a spherical aberration which negates the spherical aberration generated when light of wavelength 650 [nm] emitted from the objective lens passes through a substrate having a thickness of 0.6 [mm].

Consequently, if the phase plate 22 is not used, the spherical aberration generated when light of wavelength 650 [nm] emitted from the objective lens passes through a substrate having a thickness of 0.6 [mm] remains.

Figure 10:
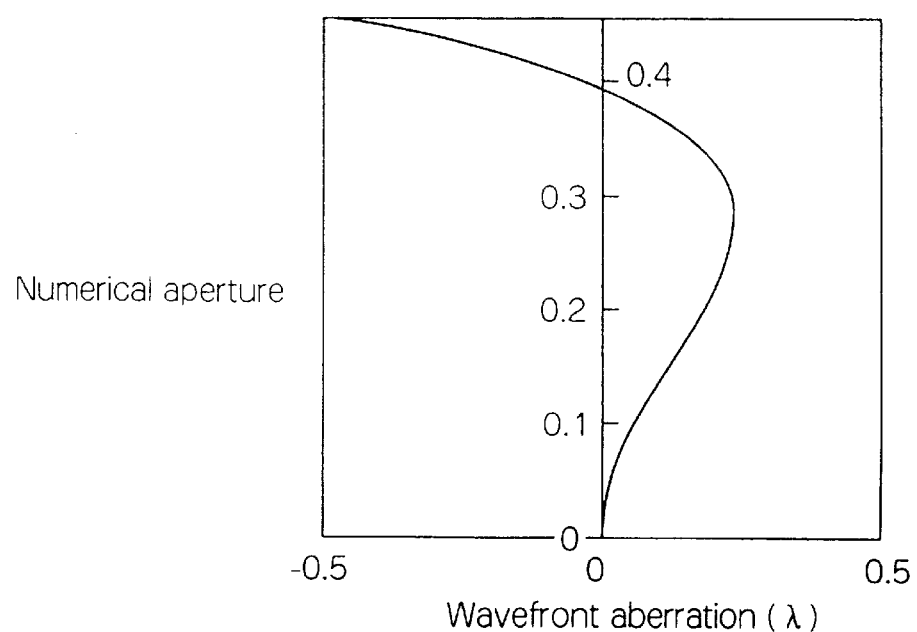
FIG. 10 This is a line diagram illustrating changes in wavefront aberration according to the second embodiment as illustrated in FIG. 9, where no wavelength-selective phase plate is used.

FIG. 10 is a diagram which illustrates the properties of wavefront aberration where no phase plate 22 is used. Here, as in the case of FIG. 4 (conventional example), the horizontal axis represents wavefront aberration, while the vertical axis represents the numerical aperture. The reason why the wavefront aberration values are reversed in comparison with the first embodiment is due to a difference in the spherical aberration of the objective lens 23.

The effective numerical aperture of the inner periphery of the objective lens 23 in relation to light of wavelength 650 [nm] is set at 0.45, and focus control is implemented to ensure minimum standard deviation of wavefront aberration.

The optimum image surface at this time is 9.4 [$\mu$m] closer to the objective lens 23 in relation to the position of the image surface when there is no aberration, and the standard deviation of wavefront aberration in that position is 0.2 $\lambda$. The phase plate 22 used in the second embodiment as illustrated in FIG. 9 is the same as the one (phase plate 14) illustrated in the aforesaid FIG. 3 (first embodiment). That is to say, it is of a structure such that a phase plate pattern 19 and an interference filter pattern 20 are formed concentrically on a glass substrate 18.

If the effective diameter of the objective lens 23 is $2a$, the phase plate pattern 19 is formed only within an area of which the diameter $2b$ is smaller than this. The cross-section of the phase plate pattern 19 is rectangular and of two levels. (Including Substrate)

Here, if the height of the phase plate pattern 19 is h, its refractive index n, and the wavelength of the incident light $\lambda$, the phase difference of light passing through the sections with and without the phase plate pattern 19 is given by the aforesaid formula (3).

For instance, where h=3.39 [$\mu$m] and n=1.46, $\phi$=4 $\pi$ (=0) in relation to $\lambda$=780 [nm], and $\phi$=4.8 $\pi$ (=0.8 $\pi$) in relation to $\lambda$=650 [nm].

The interference filter pattern 20 is formed only outside the area of diameter $2b$, as FIG. 3 (*b*) shows.

This interference filter pattern 20 serves not only to transmit all light of wavelength 650 [nm] and reflect all light of wavelength 780 [nm], but to adjust to an integral multiple of $2\pi$ the phase difference of light passing through within and outside the area of diameter $2b$.

In other words, with the phase plate 22, light of wavelength 650 [nm] all passes through, undergoing change of phase distribution in the area of diameter $2b$, while in the area between diameter $2a$ and diameter $2b$ it all passes through without undergoing any change of phase distribution. Light of wavelength 780 [nm] undergoes no change of phase distribution in the area of diameter $2b$ and all passes through, while outside the area of diameter $2b$ it is all reflected.

Consequently, if the focal length of the objective lens 23 is f, the effective numerical aperture in relation to light of wavelengths 650 [nm] and 780 [nm] is given by a/f and b/f respectively.

For instance, if f=3 [mm], a=1.8 [mm] and b=1.35 [mm], a/f=0.6 and b/f=0.45.

It should be added that the diameter at the boundary between the inner and outer peripheries of the objective lens 23 is $2b$.

In other words, the objective lens 23 has in the area of diameter $2b$ a spherical aberration which negates the spherical aberration generated when light of wavelength 780 [nm] emitted from the objective lens passes through a substrate having a thickness of 1.2 [mm], while having in the area between diameter $2a$ and diameter $2b$ a spherical aberration which negates the spherical aberration generated when light of wavelength 650 [nm] emitted from the objective lens passes through a substrate having a thickness of 0.6 [mm].

Figure 11:
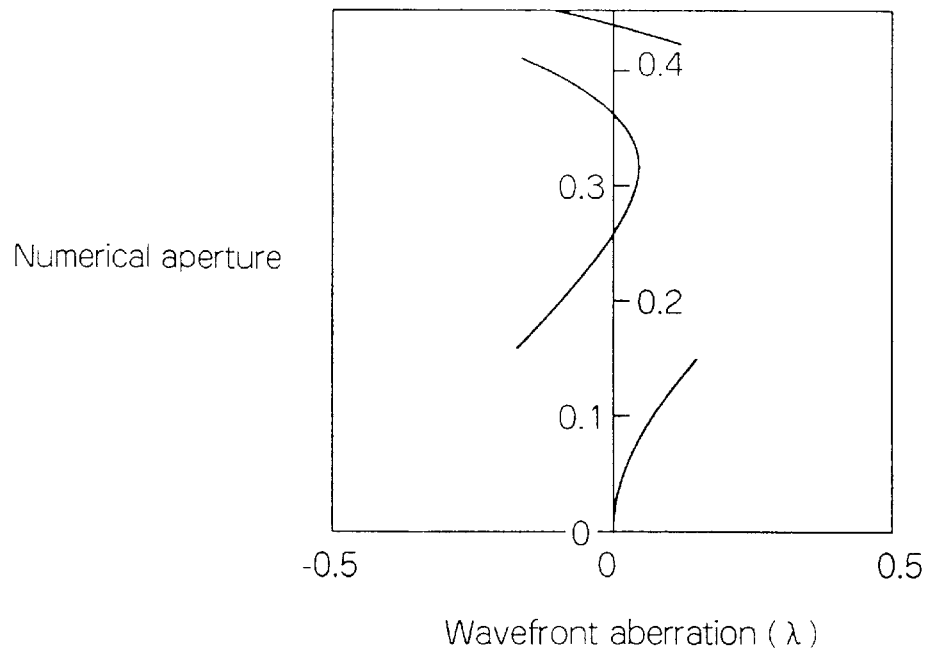
FIG. 11 This is a line diagram illustrating changes in wavefront aberration according to the second embodiment as illustrated in FIG. 9, where the wavelength-selective phase plate illustrated in FIG. 3 is used.

FIG. 11 is a diagram which illustrates the properties of wave front aberration where the phase plate 22, which is the same as the phase plate 14 illustrated in FIG. 3, is used. As in the case of the aforesaid FIG. 24 (conventional example), the horizontal axis represents wavefront aberration, while the vertical axis represents the numerical aperture.

The numerical aperture of the objective lens 23 in relation to light of wavelength 650 [nm] is set at 0.6, and the position of the phase plate pattern 19 is set as in the table shown in FIG. 5. Focus control is implemented to ensure minimum standard deviation of wavefront aberration.

The optimum image surface at this time is 12.0 [$\mu$m] closer to the objective lens 23 in relation to the position of the image surface when there is no aberration, and the standard deviation of wavefront aberration in that position is 0.091 $\lambda$. Consequently, if the objective lens 23 is designed in such a manner that the image surface of the outer periphery is 12.0 [$\mu$m] closer to the objective lens 23 in relation to the position of the image surface of the inner periphery when there is no aberration, light of wavelength 780 [nm] converges thanks to the objective lens 23 on the disc 17 without any aberration, while light of wavelength 650 [nm] converges thanks to the objective lens 23 on the disc 16, the spherical aberration accompanying the difference in substrate thickness being reduced from the aforesaid 0.226 $\lambda$ to 0.091 $\lambda$.

It should be pointed out that a comparison of FIG. 24 (*b*) with FIG. 24 (*a*) shows a shift in wavefront aberration in the positive direction in the part where the ring-shaped substrate 165 is.

Similarly, a comparison of FIG. 11 with FIG. 10 shows a shift in wavefront aberration in the positive direction in the part where the phase plate pattern 19 is.

This is because the phase difference φ given by formula (3) is positive in the ring-shaped substrate 165 of the conventional example, and also effectively positive in the phase plate pattern 19.

In the phase plate 22 illustrated in FIG. 3, the phase difference of light which passes through the parts where the phase plate pattern 19 is present or is not present is 4 π in relation to λ=780 [nm], but it need not be 4 π, and may be an integral multiple of 2π.

The phase plate 24 which is illustrated in FIG. 6 may be substituted for the phase plate 22 used in the second embodiment as illustrated in FIG. 9. In this case, it is structured in such a manner that a concentric phase plate pattern 21 and interference filter pattern 20 are formed on a glass substrate 18.

Here, if the effective diameter of the objective lens 23 is 2a, the phase plate pattern 21 is formed only within an area of which the diameter 2b is smaller than this.

Here, the cross-section of the phase plate pattern 21 is in the shape of staircase of four levels. If the difference in height of two adjacent steps is h, the reflective index n, and the wavelength of the incident light λ, the phase difference of light passing through the higher and lower of the two adjacent steps in the phase plate pattern 21 is given by the aforesaid formula (3).

For instance, where h=1.70 [μm] and n=1.46, φ=2π (=0) in relation to λ=780 [nm], and φ=2.4 π (=0.4 π) in relation to λ=650 [nm].

Here, the interference filter pattern 20 is formed only outside the area of diameter 2b, as FIG. 6 shows.

This interference filter pattern 20 serves, as in FIG. 6, not only to transmit all light of wavelength 650 [nm] and reflect all light of wavelength 780 [nm], but to adjust to an integral multiple of 2π the phase difference of light passing through within and outside the area of diameter 2b.

In other words, with the wavelength-selective phase plate 4, light of wavelength 650 [nm] all passes through undergoing change of phase distribution in the area of diameter 2b, which is the area between diameter 2a and diameter 2b to all passes through without undergoing any change of phase distribution. Meanwhile, light of wavelength 780 [nm] undergoes not change of phase distribution in the area of diameter 2b and all passes through, but outside the area of diameter 2b it is all reflected.

Consequently, if the focal length of the objective lens 23 is f, the effective numerical aperture in relation to light of wavelengths 650 [nm] and 780 [nm] is given by a/f and b/f respectively.

For instance, if f=3 [mm], a=1.8 [mm] and b=1.35 [mm], a/f=0.6 and b/f=0.45.

It should be added that the diameter at the boundary between the inner and outer peripheries of the objective lens 23 is 2b.

In other words, the objective lens 23 has in the area of diameter 2b a spherical aberration which negates the spherical aberration generated when light of wavelength 780 [nm] emitted from the objective lens passes through a substrate having a thickness of 1.2 [mm], while having in the area between diameter 2a and diameter 2b a spherical aberration which negates the spherical aberration generated when light of wavelength 650 [nm] emitted from the objective lens passes through a substrate having a thickness of 0.6 [mm].

Figure 12:
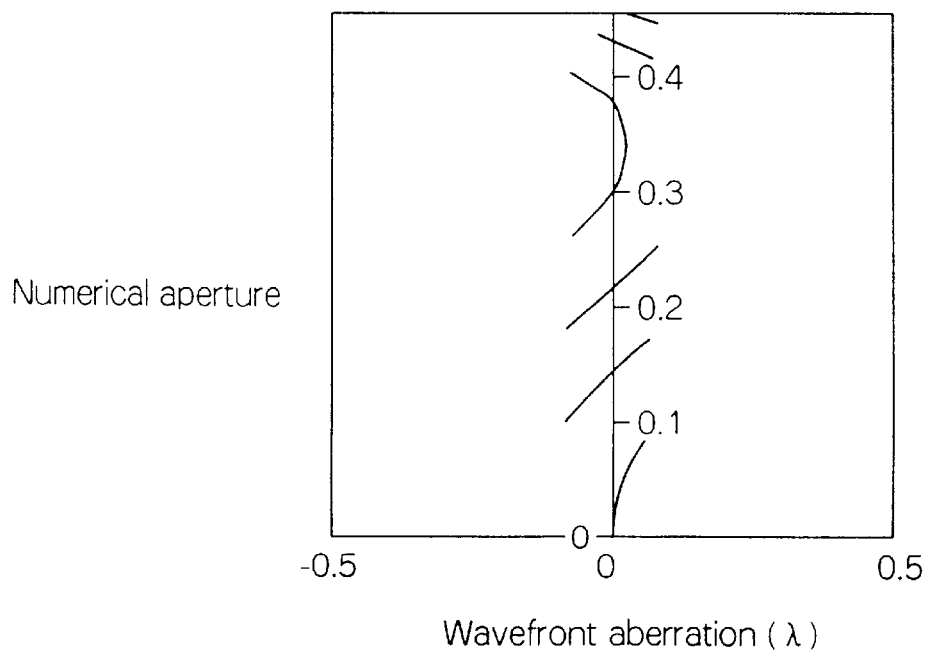
FIG. 12 This is a line diagram illustrating changes in wavefront aberration according to the second embodiment as illustrated in FIG. 9, where the wavelength-selective phase plate illustrated in FIG. 6 is used.

FIG. 12 is a diagram illustrating the properties of wavefront aberration where the phase plate 4 shown in FIG. 6 is used. As in FIG. 24 (conventional example), the horizontal axis represents wavefront aberration, while the vertical axis represents the numerical aperture.

The numerical aperture of the objective lens 23 in relation to light of wavelength 650 [nm] is set at 0.6, and the position of the phase plate pattern 21 is set as in FIG. 8. Again, focus control is implemented to ensure minimum standard deviation of wavefront aberration.

The optimum image surface at this time is 14.1 [μm] closer to the objective lens 23 in relation to the position of the image surface when there is no aberration, and the standard deviation of wavefront aberration in that position is 0.051 λ. Consequently, in this case, if the objective lens 23 is designed in such a manner that the image surface of the outer periphery is 14.1 [μm] closer to the objective lens 23 in relation to the position of the image surface of the inner periphery when there is no aberration, light of wavelength 780 [nm] converges thanks to the objective lens 23 on the disc 17 without any aberration, while light of wavelength 650 [nm] converges thanks to the objective lens 23 on the disc 16, the spherical aberration accompanying the difference in substrate thickness being reduced from the aforesaid 0.226 λ to 0.051 λ. It should be pointed out with respect to the conventional example, that a comparison of FIG. 24 (b) with FIG. 24 (a) shows a shift in wavefront aberration in the positive direction in the part where the ring-shaped substrate 165 is. Similarly, a comparison of FIG. 12, which illustrates the present embodiment, with FIG. 10 shows a considerable shift in wavefront aberration in the positive direction towards the lowest of the four levels of the phase plate pattern 21. This is because the phase difference φ given by formula (3) is positive in the ring-shaped substrate 165 in the conventional example (cf. FIG. 24), and also effectively positive in the phase plate pattern 21.

Moreover, if the same phase plate 24 as is illustrated in FIG. 6 is substituted for the wavelength-selective phase plate 22, the phase difference of light which passes through the higher and lower of two adjacent steps of the phase plate pattern 21 is 2 π in relation to λ=780 [nm], but it need not be 2 π, and may be an integral multiple of 2π. Furthermore, if the same phase plate 24 as is illustrated in FIG. 6 is substituted for the phase plate 22, the cross-section of the phase plate pattern 21 has four levels, but this may be any number of levels from three upwards.

What is more, in the embodiments illustrated in FIG. 1 and FIG. 9, the phase plate 14, 22 may be driven in a body together with the objective lens 15, 23 by means of an actuator in the focusing and tracking directions. If only the objective lens 15, 23 is driven in the tracking direction by the actuator, the center of the concentric phase plate pattern of the phase plate 14, 22 shifts from and that of the objective lens 15, 23, so that aberration is generated in light which undergoes a change of phase distribution in the phase plate 14, 22.

In this case, no such aberration occurs if the phase plate 14, 22 is driven in a body together with the objective lens 15, 23 by means of an actuator in the tracking direction. Moreover, in the embodiments illustrated in FIG. 1 and FIG. 9, the normal of the phase plate 14, 22 may be inclined slightly in relation to the optical axis of the objective lens 15, 23.

Where the normal of the phase plate 14, 22 is parallel in relation to the optical axis, stray light reflected by the phase plate 14, 22 is incident upon the photosensors within the optical systems 11 and 12. However, if the normal of the phase plate 14, 22 is inclined slightly in relation to the optical axis, such stray light is not incident upon the photosensors.

In the embodiments illustrated in FIG. 1 and FIG. 9, an interference filter 13 is used to allow light of wavelength 650 [nm] to pass through while reflecting light of wavelength 780 [nm].

Conversely, it is also possible to use an interference filter to allow light of wavelength 780 [nm] to pass through while reflecting light of wavelength 650 [nm]. In this case, the positions of the first optical system 11 and the second optical system 12 are inverted.

In the embodiments illustrated in FIG. 1 and FIG. 9, both light of wavelength 650 [nm] and light of wavelength 780 [nm] all passes through the phase plate 14, 22 within the effective numerical aperture, a good S/N is obtained during reproduction of the disc 16 and disc 17 along with satisfactory optical output during recording.

Moreover, no aberration occurs when light of wavelength 650 [nm] or light of wavelength 780 [nm] is incident upon the objective lens 15, 23 in the form of parallel light, even if the objective lens 15, 23 moves. As a result, a good S/N is obtained during reproduction of the disc 16 and disc 17 along with satisfactory peak intensity during recording.

What is more, light of wavelength 780 [nm] means that reproduction is also possible where the disc 17 is a recordable compact disc.

[Method of Producing the Phase Plate (1)]

There follows a detailed description of the method of producing the phase plate 14, 24 which forms an important part of the present invention.

Figure 13A:
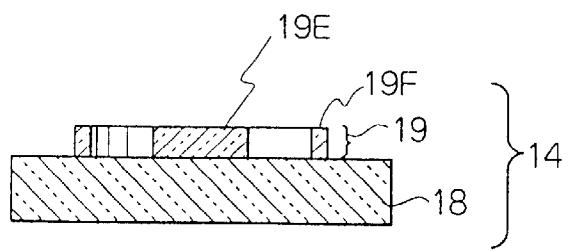
FIG. 13 These are explanatory diagrams illustrating a method of producing the wavelength-selective phase plates used in the first and second embodiments as illustrated in FIG. 3 and FIG. 6, FIG. 13 (a) being an explanatory diagram showing the method of producing the phase plate pattern of FIG. 3, while FIG. 13 (b) is an explanatory diagram showing the method of producing the phase plate pattern of FIG. 6, and FIG. 13 (c) is an explanatory diagram showing the method of producing the interference filter pattern of FIG. 3 and FIG. 6.
Figure 13B:
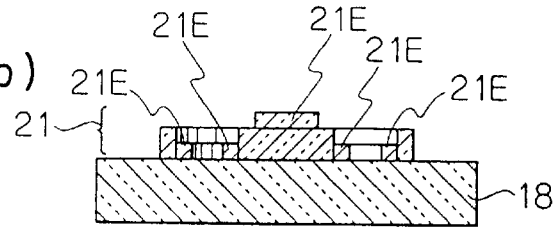
Figure 13C:
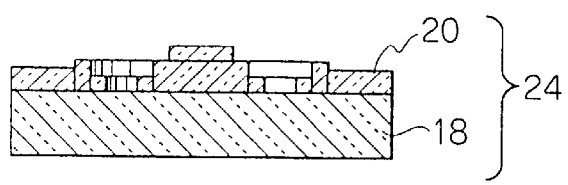

FIG. 13 illustrates a method of producing the phase plate 14, 24 which is fitted in the abovementioned first and second embodiments.

In FIG. 13 the phase plate pattern 19 is formed by first depositing a dielectric film of silicon oxide ($SiO_2$) or a similar compound on to the glass substrate 18.

Firstly, the formation of the phase plate pattern 19 will be described where its cross-section as shown in the phase plate 14 (cf. FIG. 3) is rectangular with two levels (including substrate).

As FIG. 13 (a) demonstrates, a photomask is used to deposit height h onto the areas 19E and 19F. In this manner a phase plate pattern 19 is formed on the glass substrate 18.

Where the cross-section of the phase plate pattern 21 is in the form of staircase of four levels (including substrate), as in the wavelength-selective phase plate 24 (cf. FIG. 6), a first photomask is used to deposit height 2h onto the areas 19E and 19F as in FIG. 13 (a). Then a second photomask is used to deposit height h onto the area 21E as in FIG. 13 (b). In this manner a phase plate pattern 21 is formed on the glass substrate 18.

Furthermore, the interference filter pattern 20 is formed, as illustrated in FIG. 13 (c), by using a photomask to deposit a multilayered dielectric film on the glass substrate 18 in addition to what is shown in FIG. 13 (a) or (b). In this manner the phase plate 14 or 24 is completed.

[Method of Producing the Phase Plate (2)]

Figure 14A:
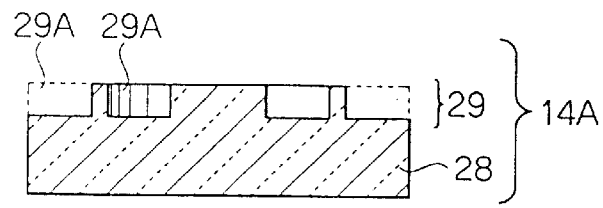
FIG. 14 These are explanatory diagrams illustrating another method of producing the wavelength-selective phase plates used in the first and second embodiments as illustrated in FIG. 3 and FIG. 6, FIG. 14 (a) being an explanatory diagram showing the method of producing the phase plate pattern of FIG. 3, while FIG. 14 (b) is an explanatory diagram showing the method of producing the phase plate pattern of FIG. 6, and FIG. 14 (c) is an explanatory diagram showing the method of producing the interference filter pattern of FIG. 3 and FIG. 6.
Figure 14B:
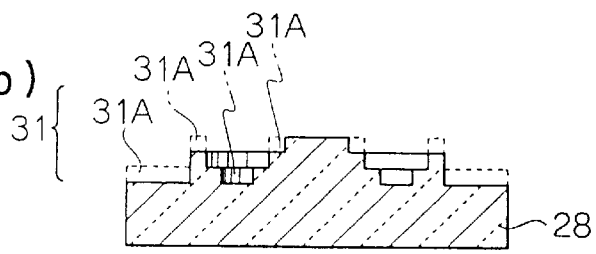
Figure 14C:
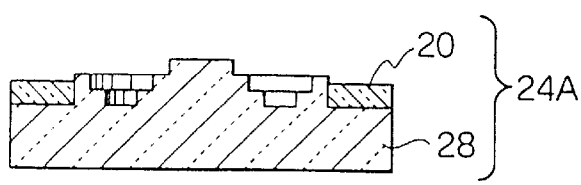

FIG. 14 illustrates another method of producing the phase plate 14, 24 which is fitted in the above-mentioned first and second embodiments.

In FIG. 14 the phase plate pattern 19 is formed by etching the glass substrate 18.

Firstly, the formation of a phase plate pattern 29 will be described. This is the same as the phase plate pattern 19 (cf. FIG. 3), and has a rectangular cross-section with two levels (including substrate). First, as FIG. 14 (a) demonstrates, a photomask is used to etch an area 29A (ring-shaped) to depth h. In this manner a phase plate between 29 is formed on the glass substrate 28 which is the same as the phase plate between 14 (cf. FIG. 3).

Where the cross-section of the phase plate pattern 31 is in the form of staircase of four levels (including substrate), as in the wavelength-selective phase plate 24 (cf. FIG. 6), a first photomask is used to etch the area 29a to depth 2h as in FIG. 14 (a). Then a second photomask is used to etch the area 31A to depth h as in FIG. 14 (b). In this manner a phase plate pattern 31 is formed on the glass substrate 28.

Furthermore, the interference filter pattern 20 is formed, as illustrated in FIG. 4 (c), by using a photomask to deposit a multilayered dielectric film on the glass substrate 28. In this manner the phase plate 14A or 24A is completed.

[Interference Filter Pattern of the Phase Plate etc.]

The multilayered dielectric film which constitutes the interference filter pattern 20 is structured in such a manner that it comprises an odd number of layers whereof the first layer has a low refractive index, while the layers onward have alternate high and low refractive indices.

In this case, if the refractive indices of the layers onward are $n_1$, $n_2$ and the thicknesses are $d_1$, $d_2$, an interference filter pattern which allows all light of wavelength 650 [nm] to pass through while reflecting all light of wavelength $\lambda$=780 [nm] may satisfy $n_1 \cdot d_1 = n_2 \cdot d_2 = \lambda/4$.

If titanium oxide ($TiO_2$) is used as the layer with the high refractive index, and silicon oxide ($SiO_2$) as the layer with the low refractive index, $n_1$ and $n_2$ are respectively 2.30 and 1.46, with the result that $d_1$=85 [nm], $d_2$=134 [nm].

Here, the thickness of the first layer is determined in such a manner that the phase difference of light passing through sections where the interference filter pattern 20 is present and where it is not is an integral multiple of $2\pi$.

It should be added that in the methods illustrated in FIG. 13 and FIG. 14 the phase plate pattern and interference filter pattern have been formed on the same surface of the same glass substrate. In contrast to this, it is also possible to form the phase plate pattern and interference filter pattern on different surfaces of the same glass substrate.

Moreover, it is possible to form the phase plate pattern and interference filter pattern on different glass substrates. In this case, it is also possible for the surfaces on which the phase plate pattern and interference filter pattern are not formed to be attached to each other by means of an adhesive agent. Furthermore, it is also possible for an anti-reflection film to be formed on one or both of the surfaces of the glass substrate.

What is more, in the methods illustrated in FIG. 13 and FIG. 14 the phase plate pattern and interference filter pattern have been formed on a glass substrate by deposition or etching. In contrast to this, it is also possible to form the phase plate pattern on glass or plastic by molding. It is also possible for the phase plate pattern or interference filter pattern to be formed on a surface of the objective lens.

[Optical Systems]

Figure 15:
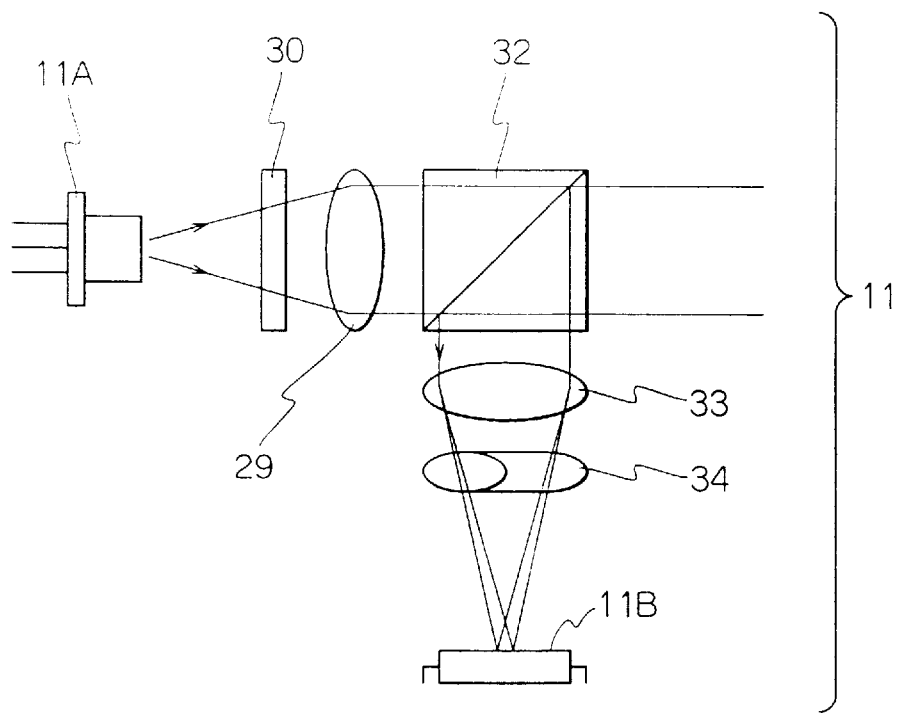
FIG. 15 This is a block diagram illustrating a configuration of the optical system including semiconductor lasers and photosensors used in the first and second embodiments as illustrated in FIG. 1 and FIG. 9.

FIG. 15 illustrates a specific example of the optical system 11 (or 12) as used in the aforesaid first and second embodiments, and including the semiconductor laser 11A and the photosensor 11B.

The optical system illustrated in FIG. 15 is suitable for read-only discs. If used without modification as the first optical system, it is capable of reproducing digital video discs with a substrate thickness of 0.6 [mm]. Similarly, if used without modification as the second optical system, it is capable of reproducing compact discs with a substrate thickness of 1.2 [mm].

There follows a more detailed description.

Light emitted from the semiconductor laser 11A provided in the optical system 11 (or 12) is divided by the diffraction grating 30 into transmitted light and ±1st order diffracted lights. These are respectively transformed into parallel lights by means of the collimator lens 29, after that roughly 50% pass through the beam splitter 32 and head towards the disc.

Roughly 50% of each type of light reflected from the disc is then reflected by the beam splitter 32, and passes through the lens 33 and cylindrical lens 34 to be received by the photosensor 11B.

Figure 16:
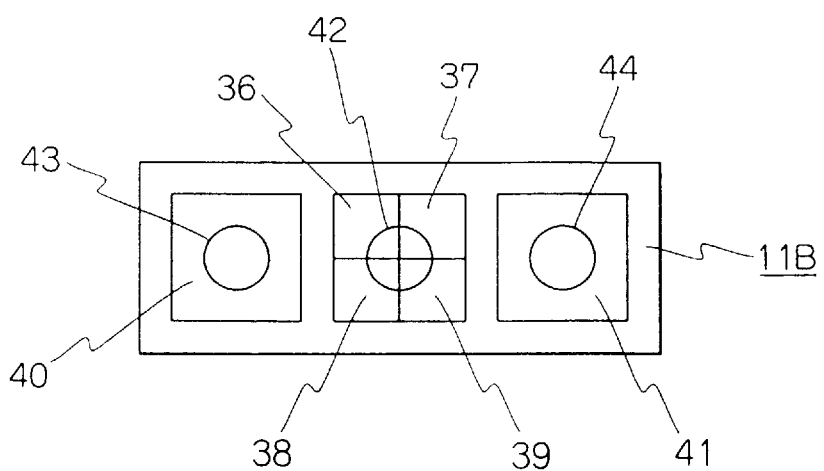
FIG. 16 This is an explanatory diagram illustrating the configuration of the photosensors in the optical system disclosed in FIG. 15.

There is no absolute need for the diffraction grating 30. FIG. 16 is a specific example of the photosensor 11B.

The transmitted light from the diffraction grating 30 in FIG. 15 forms light spot 42 on the quartered light-receiving units 36–39. Meanwhile, the ±1st order diffracted lights from the diffraction grating 30 form the light spots 43 and 44 on the light-receiving units 40 and 41 respectively.

If the output from the light-receiving units 36–41 is represented by $V_{36}$-$_{41}$ (V) respectively, the focus error signal can be calculated by the astigmatism method as follows.

$$(V_{36}+V_{39})-(V_{37}+V_{38})$$

The track error signal is obtained in relation to a digital video disc (DVD) by phase comparison of $V_{36}+V_{39}$, $V_{37}+V_{38}$ using the phase differential detective method. Moreover, it is obtained in relation to a compact disc (CD) by calculating $V_{40}-V_{41}$ using the three-beam method.

Furthermore, the disc readout signal is obtained from the calculation $V_{36}+V_{37}+V_{38}+V_{39}$.

[Other Examples of Optical Systems]

Figure 17:
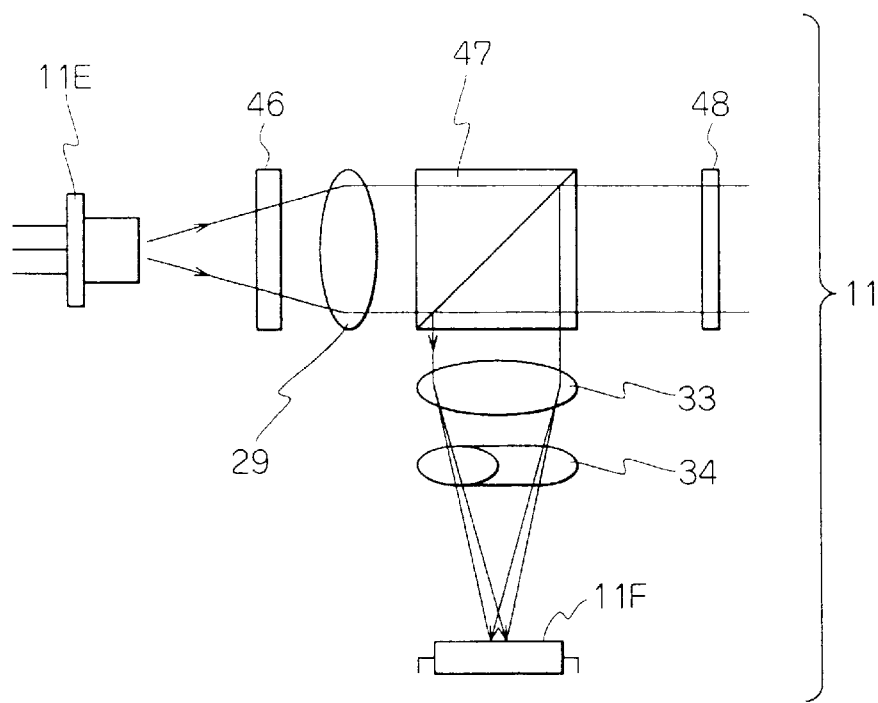
FIG. 17 This is a block diagram illustrating another configuration of the optical system including semiconductor lasers and photosensors used in the first and second embodiments as illustrated in FIG. 1 and FIG. 9.

FIG. 17 illustrates another configuration of the optical system 11 (or 12).

The optical system illustrated in FIG. 17 is suitable for recordable and rewritable discs. The first optical system 11 can be used effectively for recording and reproducing recordable and rewritable digital video discs with a substrate thickness of 0.6 [mm], while the second optical system 12 can be used effectively for recording and reproducing recordable and rewritable compact discs with a substrate thickness of 1.2 [mm].

Light emitted from the semiconductor laser 11E is divided by the diffraction grating 46 into transmitted light and ±1st order diffracted lights. These are respectively transformed into parallel lights by means of the collimator lens 29, after that they are incident as P-polarized light on the polarizing beam splitter 47. All the lights pass through, are changed from linearly polarized light to circularly polarized light by means of the quarter-wave plate 48, and head towards the disc. The lights reflected from the disc are changed from circularly polarized light to linearly polarized light by means of the quarter-wave plate 48, and are incident upon the polarizing beam splitter 47 in the form of S-polarized light. All the lights are reflected, and pass through the lens 33 and cylindrical lens 34 to be received by the photosensor 11F. There is no absolute need for the diffraction grating 46.

Figure 18:
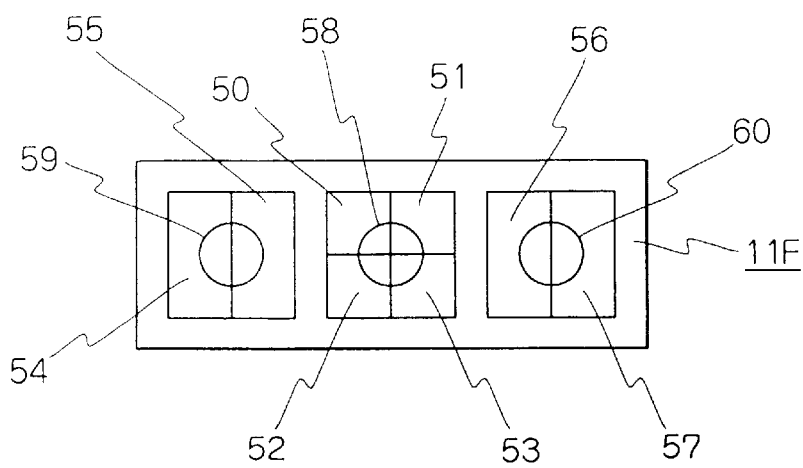
FIG. 18 This is an explanatory diagram illustrating the configuration of the photosensors in the optical system disclosed in FIG. 17.
Figure 19:
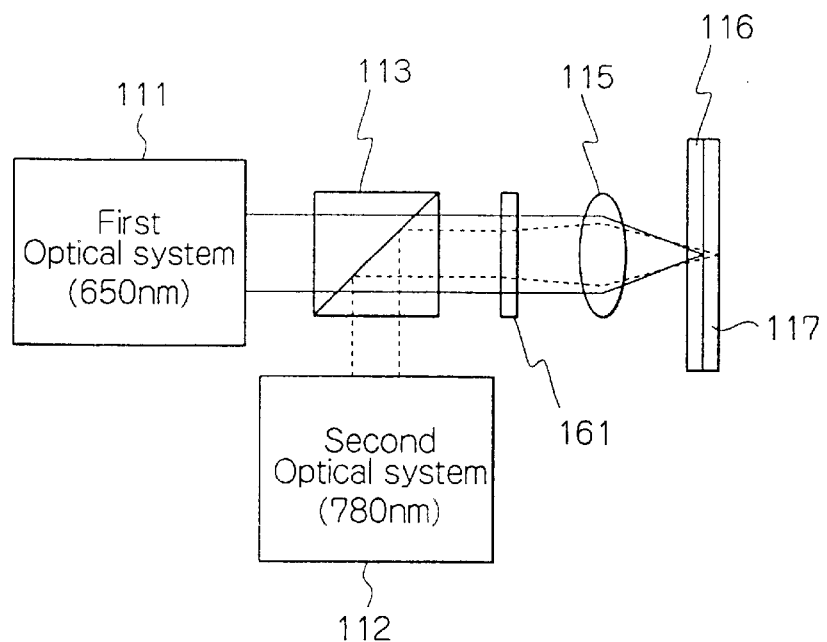
FIG. 19 This is an explanatory diagram illustrating the configuration of conventional example (1).
Figure 20A:
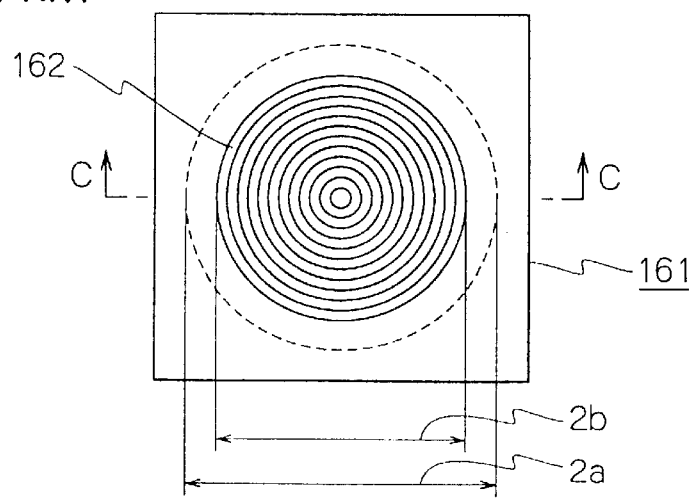
FIG. 20 This is a diagram illustrating the wavelength-selective hologram used in conventional example (1) as illustrated in FIG. 19, FIG. 20 (a) being a top view, while FIG. 20 (b) is a cross-sectional diagram along the line C—C in FIG. 20 (a).
Figure 20B:
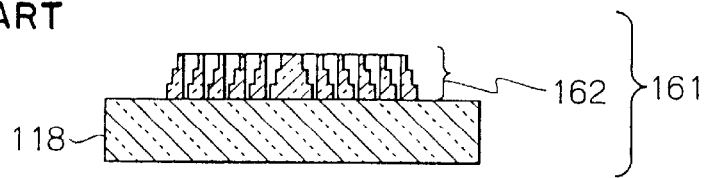
Figure 21:
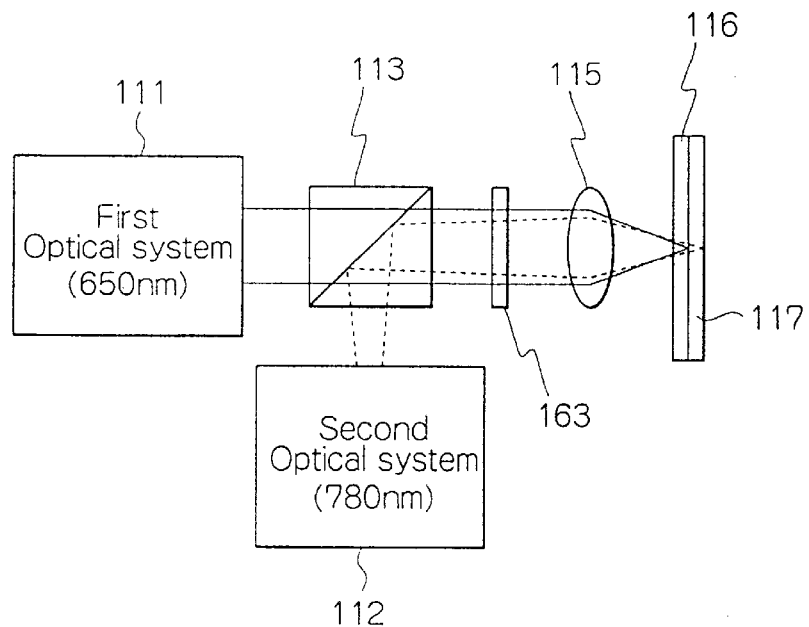
FIG. 21 This is an explanatory diagram illustrating the configuration of conventional example (2).
Figure 22A:
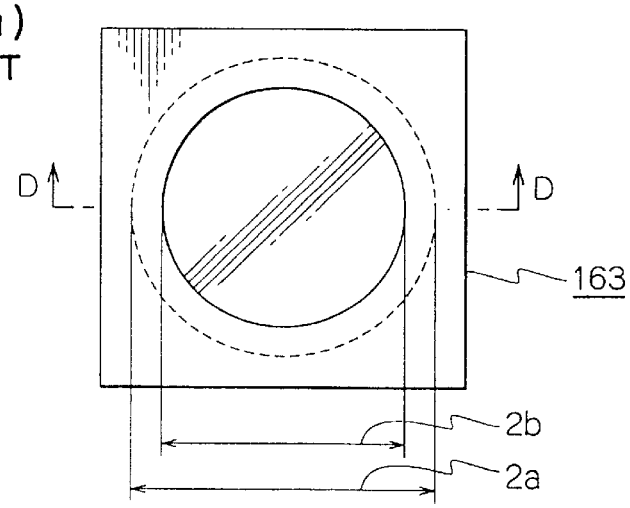
FIG. 22 This is a diagram illustrating the wavelength-selective aperture member used in conventional example (2) as illustrated in FIG. 21, FIG. 22 (a) being a top view, while FIG. 22 (b) is a cross-sectional diagram along the line D—D in FIG. 22 (a).
Figure 22B:
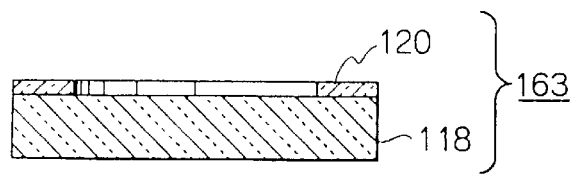
Figure 23A:
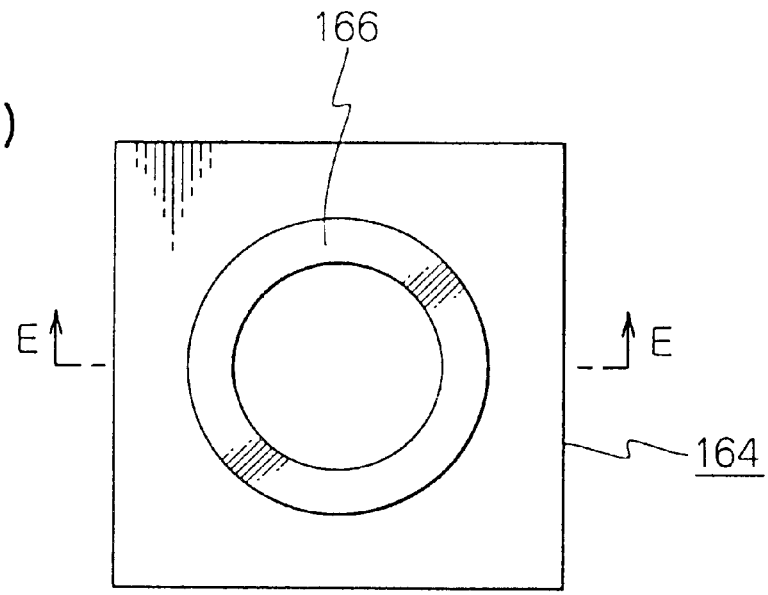
FIG. 23 This is a diagram illustrating the variable phase plate used in conventional example (3), FIG. 23 (a) being a top view, while FIG. 23 (b) is a cross-sectional diagram along the line E—E in FIG. 23 (a).
Figure 23B:
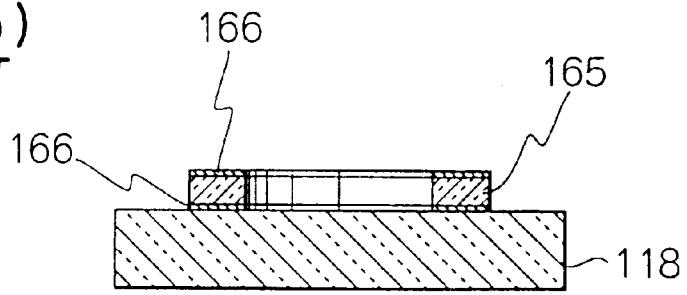

FIG. 18 illustrates the configuraion of the photosensor 11F. The transmitted light from the diffraction grating 46 forms light spot 58 on the quartered light-receiving units 50–53 of the photosensor 11F (cf. FIG. 18). Meanwhile, the ±1st order diffracted lights from the diffraction grating 46 form the light spots 59 and 60 on the halved light-receiving units 54, 55 and 56, 57 respectively.

If the output from the light-receiving units 50–57 is represented by $V_{50}$-$_{57}$ (V) respectively, the focus error signal can be calculated by the astigmatism method as follows.

$$(V_{50}+V_{53})-(V_{51}+V_{52})$$

The track error signal is obtained in relation to a rewritable digital video disc or compact disc by calculating $(V_{50}+V_{52})-(V_{51}+V_{53})$ using the push-pull method.

Moreover, it is obtained in relation to a recordable digital video disc or compact disc by calculating $(V_{50}+V_{52})-(V_{51}+V_{53})-K[(V_{54}+V_{56})-(V_{55}+V_{57})]$ using the differential push-pull method. Here, K is a constant. The disc readout signal is obtained by calculating $V_{50}+V_{51}+V_{52}+V_{53}$.

In the respective configurations of the optical systems 11, 12 illustrated in FIG. 15 and FIG. 17, the semiconductor lasers and photosensors are housed as separate packages.

In contrast, it is also possible to house the semiconductor lasers and photosensors in the same package for the sake of compactness.

In this case, a holographic optical element or polarizing holographic optical element may be used instead of the beam splitter or polarizing beam splitter.

[Effect of the Invention]

As has been described above, the present invention has two semiconductor lasers of different wavelengths and a phase plate, and is structured in such a manner that light of a prescribed wavelength (eg 650 [nm]) is used for recording and reproduction in relation to discs of a prescribed thickness (eg DVDs), while light of another wavelength (eg 780 [nm]) is used for recording and reproduction in relation to discs of another thickness (eg CDs). In respect of the phase plate, a method is adopted whereby spherical aberration resulting from the difference in substrate thickness is corrected by leaving unchanged the phase distribution in relation to light of a prescribed wavelength output from the first optical system, while changing the phase distribution in relation to light of a different prescribed wavelength output from the second optical system.

Consequently, in the present invention, light of wavelengths output respectively from the first and second optical systems all passes through the phase plate, for which reason a better S/N is obtained during reproduction than in conventional optical head devices, while a satisfactory optical output is obtained during recording. Moreover, by ensuring that light of wavelengths output respectively from the first and second optical systems is incident on the objective lens in the form of parallel light, the present invention avoids the occurrence of aberration when the objective lens moves. As a result, it is possible to obtain better jitter during reproduction than in conventional optical head devices, while at the same time achieving a satisfactory peak intensity during recording, thus facilitating the realization of an optical head device having outstanding effects hitherto unknown.

Furthermore, by setting the laser light output from the second optical system at, for instance, 780 [nm], the present invention has the effect of enabling the reproduction of recordable compact discs, which has not been possible in conventional optical head devices.

The invention may be embodied in other specific forms without departing from the spirit or essential characteristic thereof. The present embodiments is therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 9-140129 (Filed on May 29, 1997) including specification, claims, drawings and summary is incorporated herein by reference in its entirety.

What is claimed is:

1. An optical head device which records and reproduces data on an optical recording medium, comprising:

(a) a first optical system having a first semiconductor laser which oscillates at a first wavelength and a first photosensor which receives laser light of said wavelength;

(b) a second optical system having a second semiconductor laser which oscillates at a second, different wavelength from the semiconductor laser of the first optical system and a second photosensor which receives laser light of said second wavelength;

(c) a light combining and dividing device which combines light emitted from said first and second semiconductor lasers and directs said combined light to an optical recording medium having a prescribed thickness, and which divides light reflected from said optical recording medium and directs said divided light to said first or second photosensors respectively;

(d) an objective lens located between said light combining and dividing device and said optical recording medium; and (e) a phase plate positioned between said light combining and dividing device and said objective lens, said phase plate not significantly changing the phase distribution in relation to one of said first and second wavelengths, while significantly changing the phase distribution in relation to the other of said first and second wavelengths.

2. The optical head device according to claim 1, wherein:

(a) said objective lens has a spherical aberration which negates the spherical aberration generated in relation to said first wavelength when light emitted from said objective lens passes through said substrate of said prescribed thickness corresponding to said first optical system, and (b) said one of said first and second wavelengths is said first wavelength.

3. An optical head device according to claim 1, wherein:

(a) said objective lens has on its inner periphery a spherical aberration which negates the spherical aberration generated in relation to said second wavelength when light emitted from said objective lens passes through said substrate of said prescribed thickness corresponding to said second optical system, while having on its outer periphery a spherical aberration which negates the spherical aberration generated in relation to said first wavelength when light emitted from said objective lens passes through a substrate of said prescribed thickness corresponding to said first optical system, and (b) said one of said first and second wavelengths is said second wavelength.

4. An optical head device according to claim 1, wherein:

(a) the first wavelength is set in the vicinity of 650 [nm], while (b) the second wavelength is set in the vicinity of 780 [nm].

5. The optical head device according to claim 1, wherein:

(a) the laser light output from said first optical system is targeted at an optical recording medium with a thickness of around of 0.6 [mm], while (b) the laser light output from said second optical system is targeted at an optical recording medium with a thickness of around of 1.2 [mm].

6. The optical head device according to claim 1, wherein: the lights emitted from said first and second semiconductor lasers are incident upon said objective lens in the form of parallel light.

7. The optical head device according to claim 1, wherein: said phase plate is of a structure such that a concentric phase plate pattern and an interference pattern are formed on a substrate.

8. The optical head device according to claim 7, wherein: said phase plate pattern is formed only within a circular area with a diameter less than the effective diameter of said objective lens.

9. The optical head device according to claim 7, wherein: the cross-section of said phase plate pattern is in the shape of a rectangle with two levels.

10. The optical head device according to claim 9, wherein: the phase difference of the light which passes through the sections within and without said phase plate pattern is an integral multiple of $2\pi$ in relation to the first and second wavelengths.

11. The optical head device according to claim 7, wherein: the cross-section of said phase plate pattern is in the shape of a staircase with three or more levels.

12. The optical head device according to claim 11, wherein: the phase difference of the light which passes through the higher and lower of two adjacent steps in said phase plate pattern is an integral multiple of $2\pi$ in relation to the first and second wavelengths.

13. The optical head device according to claim 7, wherein: said interference filter pattern is formed only outside a circular area with a diameter less than the effective diameter of said objective lens.

14. The optical head device according to claim 13, wherein:

(a) said interference filter pattern has the property of allowing all said first wavelength to pass through, while reflecting all the second wavelength, and (b) said interference filter pattern adjusts the phase difference of the light which passes within said circular area and that which passes outside said circular area to an integral multiple of $2\pi$ in relation to the first and second wavelengths.

15. The optical head device according to claim 1, wherein: said phase plate is driven in a body with said objective lens by means of an actuator in the focusing direction and in the tracking direction.

16. The optical head device according to claim 1, wherein: the normal of said phase plate is inclined slightly in relation to the optical axis of said objective lens.

17. The optical head device according to claim 1, wherein: said light combining and dividing device comprises an interference filter with the property of allowing said first wavelength to pass through, while reflecting light of the second wavelength.

18. The optical head device according to claim 7, wherein: said phase plate pattern is formed by depositing a dielectric film onto a glass substrate.

19. The optical head device according to claim 7, wherein: said phase plate pattern is formed by etching a glass substrate.

20. The optical head device according to claim 7, wherein: said interference filter pattern is formed by depositing a multilayered dielectric film onto a glass substrate.

21. The optical head device according to claim 20, wherein: said multilayered dielectric film is structured in such a manner that it comprises an odd number of layers whereof the first layer has a low refractive index, while the remaining layers have alternate high and low refractive indices.

22. The optical head device according to claim 7, wherein: said phase plate pattern and said interference filter pattern are formed on the same surface of the same glass substrate.

23. The optical head device according to claim 22, wherein: an anti-refection film is formed on at least one surface of said glass substrate.

24. The optical head device according to claim 7, wherein: said phase plate pattern and said interference filter pattern are formed on two different glass substrates.

25. The optical head device according to claim 24, wherein: the two glass substrates on which said phase plate pattern and said interference filter pattern are formed are attached to each other by means of an adhesive agent.

26. The optical head device according to claim 25, wherein: an anti-refection film is formed on one or both of the surfaces of said glass substrate.

27. The optical head device according to claim 24, wherein: an anti-refection film is formed on one or both of the surfaces of said glass substrate.

28. The optical head device according to claim 7, wherein: said phase plate pattern or said interference filter pattern is formed on a surface of said objective lens.

29. The optical head device according to claim 7, wherein: said phase plate pattern is formed by molding glass or plastic.

30. The optical head device according to claim 7, wherein: said phase plate pattern and said interference filter pattern are formed on different surfaces of the same glass substrate.

31. The optical head device according to claim 30, wherein: an anti-refection film is formed on one or both of the surfaces of said glass substrate.

32. The optical head device according to claim 1, wherein said first optical system or said second optical system is provided with a collimator lens which ensures that light emitted respectively from said first or second semiconductor laser is parallel.

33. The optical head device according to claim 1, wherein: said first optical system or said second optical system is provided with means of separating light whereby light emitted from said first or second semiconductor laser housed within it and directed toward the corresponding recording medium is separated from light reflected by said corresponding recording medium and directed toward said first or second photosensor.

34. The optical head device according to claim 33, wherein: said means of separating light comprises a beam splitter.

35. The optical head device according to claim 33, wherein:

(a) said means of separating light comprises a polarizing beam splitter, and (b) a quarter-wave plate is located between said polarizing beam splitter and said objective lens.

36. The optical head device according to claim 33, wherein: said first semiconductor laser and said first photosensor, or said second semiconductor laser and said second photosensor are contained in the same package.

37. The optical head device according to claim 36, wherein: said means of separating light comprises a holographic optical element.

38. The optical head device according to claim 36, wherein:

(a) said means of separating light comprises a polarizing holographic optical element, and (b) a quarter-wave plate is located between this polarizing holographic optical element and said objective lens.

* * * * *